(12) United States Patent
Grambihler et al.

(10) Patent No.: US 6,560,655 B1
(45) Date of Patent: May 6, 2003

(54) SYNCHRONIZATION MANAGER FOR STANDARDIZED SYNCHRONIZATION OF SEPARATE PROGRAMS

(75) Inventors: Roger F. Grambihler, Woodinville, WA (US); Chao-Chia Liu, Bellevue, WA (US); Murthy Srinivas, Redmond, WA (US); Susan E. Strom, Redmond, WA (US); Gopal Parupudi, Issaquah, WA (US); Daniel Plastina, Issaquah, WA (US); Robert E. Corrington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/338,352

(22) Filed: Jun. 22, 1999

(51) Int. Cl.[7] ................................................ G06F 15/16

(52) U.S. Cl. ..................... 709/248; 709/202; 709/214; 709/244; 709/318; 709/320; 714/707

(58) Field of Search ................................ 709/200–203, 709/213–216, 244, 246, 248, 250, 100, 107, 318, 320–321; 714/707

(56) References Cited

U.S. PATENT DOCUMENTS

| 5,367,680 | A | * | 11/1994 | Flurry et al. | 709/107 |
|---|---|---|---|---|---|
| 5,432,940 | A | * | 7/1995 | Potts et al. | 709/320 |
| 5,790,974 | A | * | 8/1998 | Tognazzini | 709/202 |
| 5,796,939 | A | * | 8/1998 | Berc et al. | 714/47 |
| 5,968,131 | A | * | 10/1999 | Mendez et al. | 709/248 |
| 6,205,448 | B1 | * | 3/2001 | Kruglikov et al. | 709/248 |
| 6,252,889 | B1 | * | 6/2001 | Patki et al. | 370/474 |
| 6,308,201 | B1 | * | 10/2001 | Pivowar et al. | 709/214 |

* cited by examiner

Primary Examiner—Bharat Barot
(74) Attorney, Agent, or Firm—Law Offices of Albert S. Michalik, PLLC

(57) ABSTRACT

A centralized manager for managing the data synchronization operations for multiple applications according to user preferences. Applications register respective COM handlers with the synchronization manager via COM methods. On a synchronize event the synchronization manager queues the registered application handlers, and calls the handlers to perform the synchronization of items therein. Progress and results are communicated to a user-viewable dialog via callbacks from the handlers to the synchronization manager. The synchronization manager provides consistent user interfaces for obtaining user preferences related to synchronization and for presenting information to the user, thus resulting in a consistent user experience.

50 Claims, 6 Drawing Sheets

SYNCHRONIZATION MANAGER FOR STANDARDIZED SYNCHRONIZATION OF SEPARATE PROGRAMS

TECHNICAL FIELD

The invention relates generally to computer systems, and more particularly to an improved method and system for managing the synchronization of local and remote data by multiple applications and system components.

BACKGROUND OF THE INVENTION

Many computer users store their data on a network server, and then need access to that data when not connected to the server. For example, mobile computer users often install a number of applications that allow them to work while disconnected from the corporate network, i.e., while offline, and thus need access to their files. In one commonplace situation, a mobile user has both a company-provided desktop machine connected directly to the network, and a home machine which can temporarily connect to the network through a dial-up connection to access the data. Other users may have a laptop for traveling, a home machine and a corporate machine. Similarly, even in non-networked environments, a mobile user may work on a laptop computer while traveling instead of a home desktop computer. In each of these situations, the user typically needs to download data, work offline, and propagate any changes back to the network (or other machine).

Some applications provide the user with various mechanisms for downloading and synchronizing data for offline use. For example, Microsoft® Corporation's Outlook™ application program provides for a user to synchronize (e.g., generally download) electronic mail messages for offline use. Then, upon return to the office and reconnection to the network, or periodically via a dial-in connection to the network, the user instructs the application to synchronize (e.g., generally upload) data to handle offline activities.

Thus, to prepare for mobile computing, the user needs to instruct such applications to accumulate (e.g., download) the data for offline use while connected to the network. Upon later reconnection, the user needs to instruct the applications to synchronize offline changes to that data with the network. However, a first difficulty with synchronization that is encountered by a user is that each application that provides a synchronization mechanism has its own user interface, methods and configuration settings to accomplish the synchronization. As a result, the user needs to learn a different user interface to configure various settings for each application. Moreover, each of the applications present their information (e.g., the download progress) differently to the user, whereby the user has to learn to correctly deal with these different presentations of information for each application. In general, the user has inconsistent experiences when synchronizing the data of various applications.

A second, and perhaps more frustrating difficulty encountered by a user, is that the user needs to explicitly start each application to synchronize that application's data. As a result, if the user wants to synchronize data from several applications, the user needs to individually start each application to perform the synchronization. As can be appreciated, this can become a time-consuming and tedious procedure, especially for users that frequently work away from the network.

SUMMARY OF THE INVENTION

Briefly, the present invention provides a centralized, standardized mechanism for managing the synchronization of data between local and remote computers according to user preferences. Applications register respective handlers with a synchronization manager. On a synchronize event, such as a manual request for synchronization, or, based on user preferences, a notification of an event such as logon or logoff, the synchronization manager queues the registered application handlers, and calls the handlers to perform the synchronization of items therein. Progress and results are communicated to a user-viewable dialog via callbacks from the handlers to the synchronization manager.

The synchronization manager provides consistent user interfaces for obtaining user preferences related to synchronization and for presenting information to the user, thus resulting in a consistent user experience. A connection object obtains and/or or maintains a network connection, such as for purposes of performing scheduled synchronizations.

Other advantages will become apparent from the following detailed description when taken in conjunction with the drawings, in which:

DETAILED DESCRIPTION OF THE INVENTION

Exemplary Operating Environment

Figure 1:
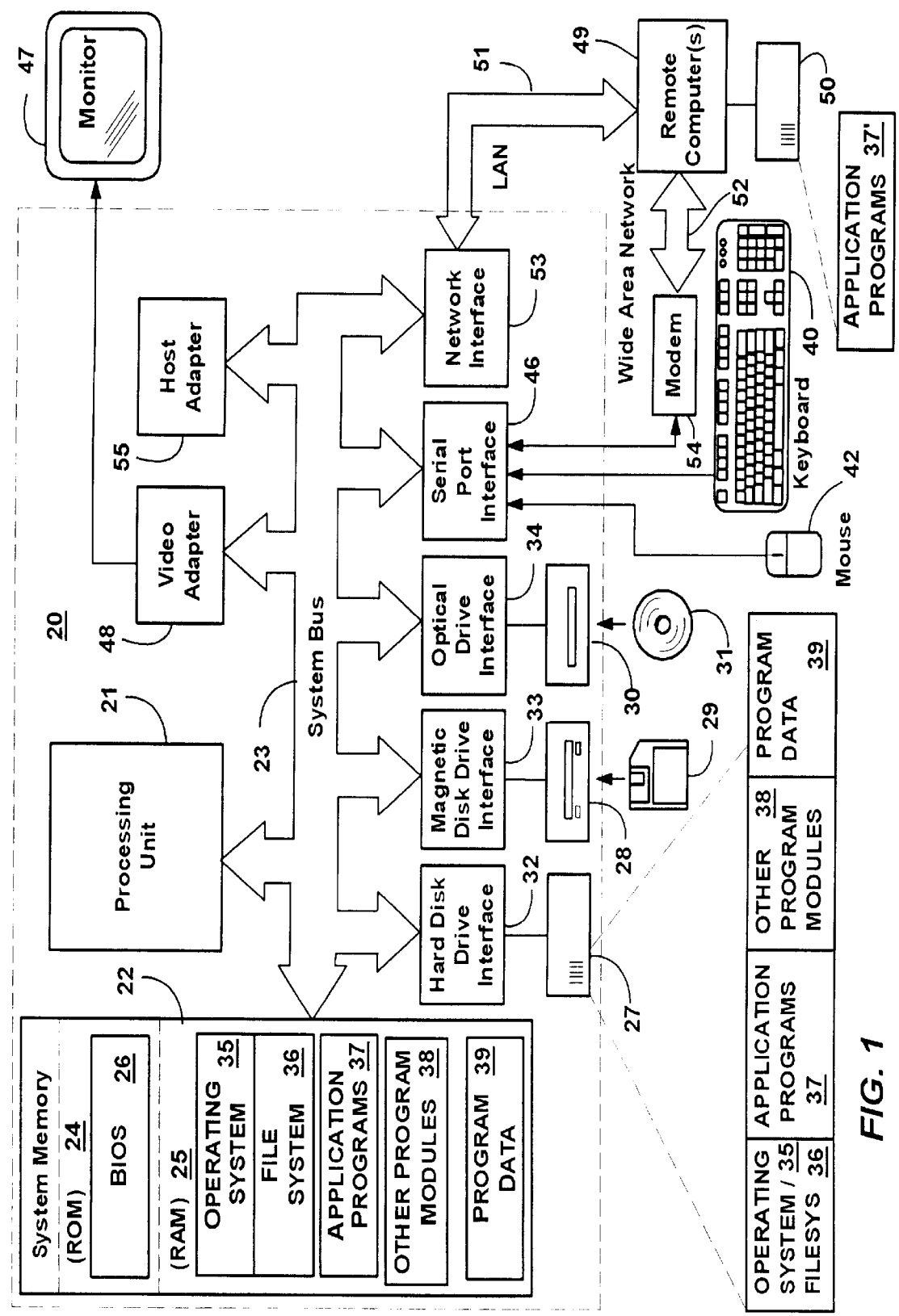
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 and file system 36, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The Synchronization Manager

In general, a synchronization manager 60 (FIG. 2) is provided to manage the synchronization of data from multiple applications $62_1$–$62_m$ and other system components, such as to synchronize data maintained at different locations, in a standardized way. To accomplish this in a manner that provides a consistent experience from the user's perspective, the synchronization manager 60 provides a common set of wizards and dialog boxes 64 to the user regardless of the application and/or data that is being synchronized. From the perspective of the applications $62_1$–$62_m$, the synchronization manager 60 is a centralized manager that coordinates the applications' synchronizations, and provides a common set of interfaces (e.g., Component Object Model, or COM interfaces) defined for the applications $62_1$–$62_m$ to take advantage of the synchronization manager 60. Note that while the present invention will be primarily described below with reference to examples in the COM architecture, alternate forms of defining interfaces and interprocess communication may be used for communication between the synchronization manager 60, the applications $62_1$–$62_m$, and/or one or more event notification mechanisms, including LPC (local procedure call), LRPC (lightweight remote procedure call), Sockets, Windows messages, Shared Memory and others known to those skilled in the art.

Figure 2:
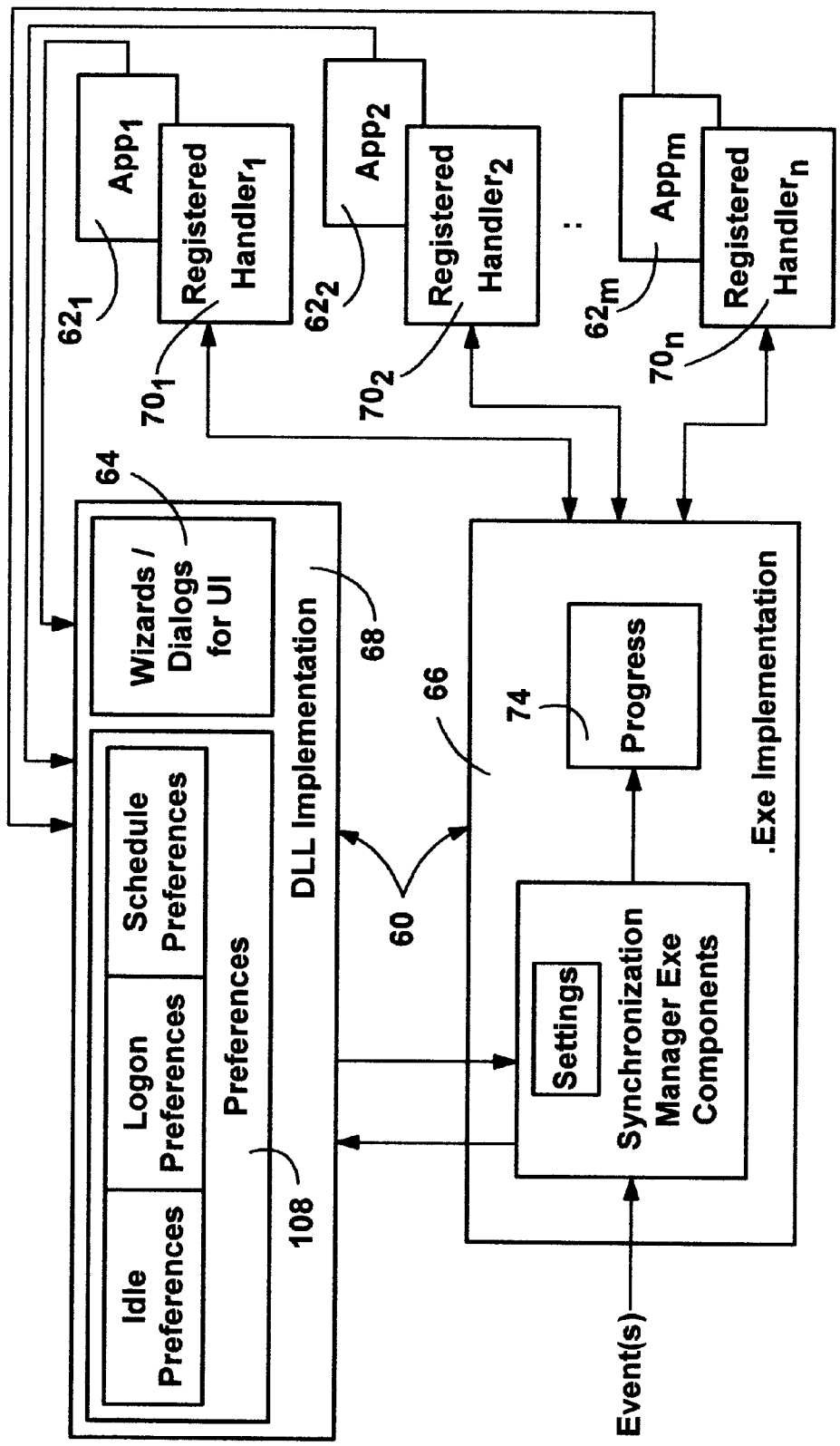
FIG. 2 is a block diagram representing general components for synchronizing data on an event in accordance with one aspect of the present invention.
Figure 3:
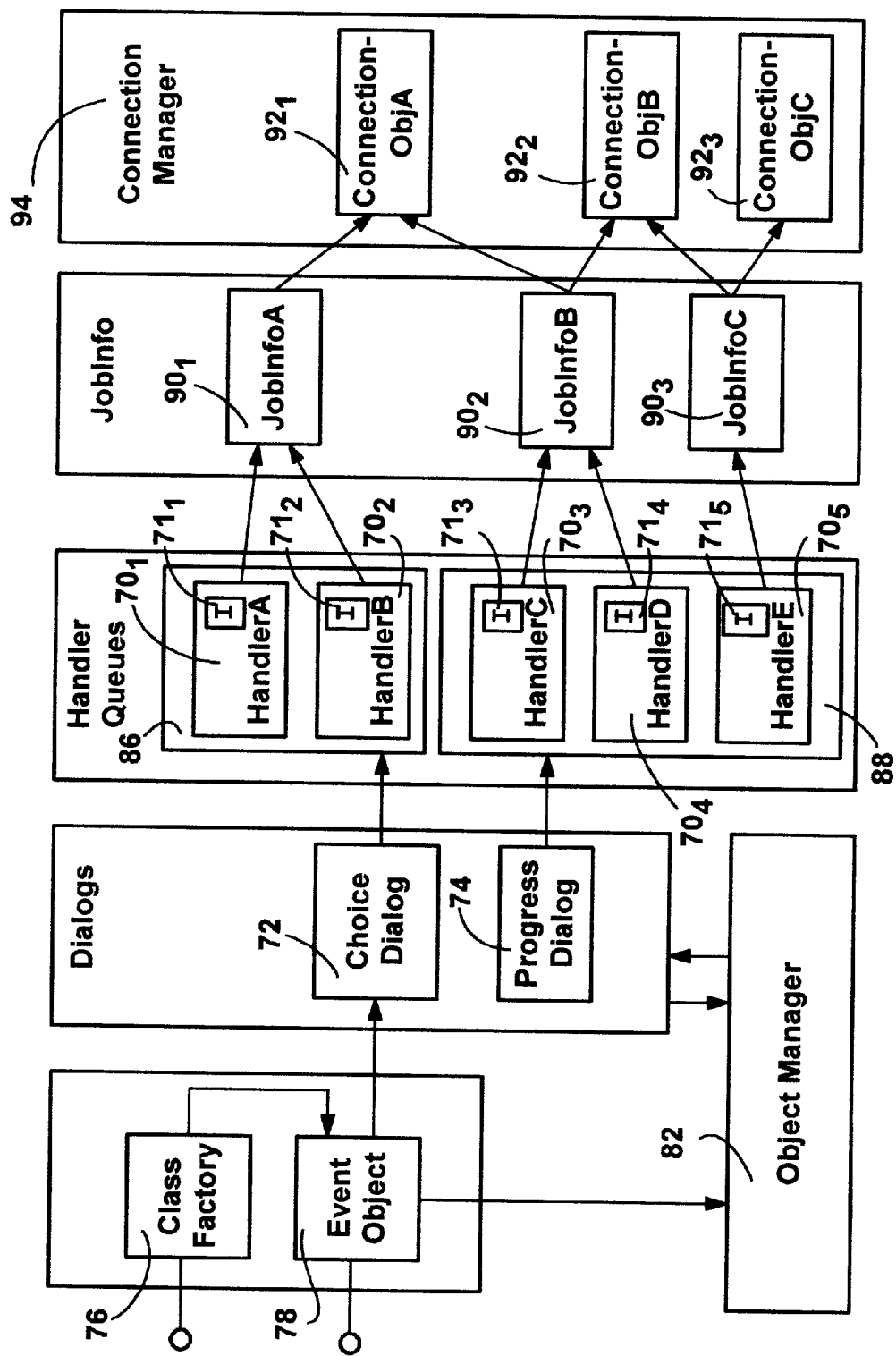
FIG. 3 is a block diagram representing components including instantiated objects to synchronize multiple applications in accordance with one aspect of the present invention.

Although not necessary to the present invention, for convenience, the synchronization manager 60 is separated into an executable implementation 66 and a dynamic link library (DLL) implementation 68 as shown in FIG. 2. The synchronization manager 60, including the components of the executable portion 66 described in more detail below with reference to FIG. 3, is started when a first synchronization event is received. The DLL implementation 68, described in more detail below with reference to FIG. 4, primarily deals with receiving and maintaining user-selectable information such as settings and schedules set by the user.

Each handler provider is responsible for registering its handler with the synchronization manager 60. Each application first registers one or more appropriate handlers (e.g. $70_1$ of FIG. 2) with the synchronization manager 60. For example, in one implementation, the synchronization manager 60 uses the well-documented COM architecture, and in that implementation, the handler is a registered COM Inproc Server that supports the synchronization manager 60 interfaces necessary to plug into synchronization manager 60. Alternatively, LocalServer and other activations may be employed.

As represented in FIG. 2, the synchronization manager 60 receives events which trigger its operation to manage data synchronization. For example, to manually request synchronization, the user selects a synchronize operation, such as via a Start Menu or a shortcut, which generates an event. In addition to manually generated events, other events include notifications of logon and logoff, programmatic events sent by an application, scheduled synchronization notifications fired by a scheduling service such as Task Scheduler or the like, or events that are automatically generated to synchronize data during idle times. When an event comes in, the synchronization manager 60 retrieves any settings (e.g., based on user preferences) corresponding to that event from the DLL implementation 68, provides a choice dialog 72 as needed to interface with the user to obtain any user choices, queues and runs the registered handlers $70_1$–$70_n$ to synchronize items specified therein, and receives data from handlers $70_1$–$70_n$ via a callback mechanism to display a progress dialog 74.

More particularly, as represented in FIG. 3, when the synchronization manager 60 is launched, the synchronization manager 60 may first check to see if there are already any running instances of itself. For example, in the COM implementation, if no other instances are running, the synchronization manager 60 registers a standard COM class factory 76 and calls the class factory 76 (via CoCreateInstance) to obtain access to an instance of an event object 78. Alternatively, if another instance of a synchronization manager is already running, (e.g., InstanceA), the newly-launched instance (e.g., InstanceB) does not register a class factory, but calls CoCreateInstance on the other instance's (InstanceA's) class factory to return an event object 78 therefrom. Once a proper method of the event object 78 is called, the newly-launched instance, (InstanceB), terminates. Note that multiple instances of the synchronization manager may be run, particularly if multiple progress dialogs are desired, however checking for the single instance enables the synchronization manager to use the existing progress dialog 74 when desired.

As is understood by those skilled in the art, virtually any event notification mechanism will suffice for providing events to the synchronization manager. In one implementation, the event object 78 is called to indicate that an event has occurred and that synchronization should take place. The event object 78 may be, for example, a standard COM object having defined public and private interfaces, whereby in one implementation, the public interfaces are called by an LCE (Loosely Coupled Events) service/SENS (System Event Notification Service) 80 (FIG. 4) to inform the synchronization manager 60 of logon/logoff and network connection events. These interfaces have been defined by and LCE and SENS 80. SENS, which fires events to the synchronization manager 60, and the COM-based LCE architecture are generally described in U.S. patent application Ser. Nos. 09/256,624, 09/257,363 and 09/257,364 respectively entitled "System Event Notification Service," "Object Connectivity Through Loosely Coupled Publish And Subscribe Events," and "Object Connectivity Through Loosely Coupled Publish And Subscribe Events With Filtering," assigned to the assignee of the present invention and hereby incorporated by reference in their entireties. The private methods are used internally for handling events that are received by synchronization manager 60 through either command line arguments or from a programmatic invoke. More particularly, when the synchronization manager 60 is invoked it parses the command line argument to determine what event has been requested, e.g., schedule, idle, and so forth. If there is no command line argument, an UpdateAll( ) is performed. Next the synchronization manager 60 calls CoCreateInstance( ) of the class factory 76 to get the event object 78, and calls an appropriate method thereof.

As represented in FIG. 3, the event object 78 communicates with an object manager 82, which provides a set of functions for managing lifetime and global housekeeping information for the application. The object manager 82 also handles requests for finding and creating objects, such as the choice and progress dialogs 72 and 74 used to interface with the user, i.e., the event object 78 asks the object manager 82 for a dialog when the event object 78 needs one. It is the responsibility of the object manager 82 to either find an already created dialog or create a new instance of the requested dialog and return the dialog object to the caller.

By way of example, if the event object 78 corresponds to an event that provides choices to a user, e.g., the event corresponds to a manual request by the user to synchronize certain user-selectable items $71_1$–$72_5$, the event object 78 requests the choice dialog 72 from the object manager 82. One or more choice dialogs may exist at any one time, and also may be shared. For example, if the synchronization manager is launched from the Start Menu, or launched programmatic ally while already showing the handlers, the choice dialog is shared. To share a choice dialog 72 that already exists, instead of creating another choice dialog, the object manager 82 finds the existing choice dialog 72 for the event object 78. Alternatively, if a choice dialog is brought up in the context of an application, only handler items for that application are listed, and switching to another application lists its handler items in a separate choice dialog in that other application's context. Separate progress dialogs (e.g., per application) may be similarly provided when appropriate.

The object manager 82 may track how many event objects are using the choice dialog 72, so as to close the dialog only when no longer needed by an event object 78, i.e., the choice dialog 72 supports lifetime via reference counting functions on the object manager 82. For example, when the event object 78 is done with a dialog it calls a ReleaseDialog( ) function implemented by the object manager 82 to decrement the references on the dialog. Note that there are also general lifetime routines on the object manager 82 independent of dialogs 64. For example, when an event object 78 is created it puts a lifetime on the application, and then when the event object 78 is released, it decrements the lifetime count. When all dialogs have been released and there are not lifetime counts on the application, the object manager 82 shuts down the application.

In general, the choice dialog 72 is shown to the user following manual synchronize requests in order to enable the user to select which handler items need to be synchronized, i.e., the choice dialog 72 brings up a list of handler items to the user to allows them to pick which items to synchronize. For example, the choice dialog 72 enables the user to select an e-mail handler for synchronizing e-mail messages, and then secondarily select certain e-mail items to synchronize, such as messages from the corporate e-mail account (one item) but not a personal e-mail account (another item). To display the available (registered) handlers $70_1$–$70_n$ and their items, the choice dialog 72 queues the registered handlers $70_1$–$70_n$, obtains their information such as their name and accompanying icon to display, and then calls each handler (e.g., $70_1$) to enumerate the items (e.g., $71_1$) that the handler $70_1$ can synchronize. The user clicks on displayed representations of the handlers and or items (e.g., on accompanying checkboxes) for which synchronization is desired, whereby the handlers and their items (e.g., $71_1$) are queued into a choice queue 86.

In the choice dialog 72 (and also in the progress dialog 74), there is a button for pulling up a settings dialog 84 (FIG. 4) of the DLL implementation 68, whereby the user can adjust various synchronization-related settings such as schedules and preferences. The choice dialog 72 also provides a synchronize button or the like whereby after selection of the handler items, the user may start the synchronization. When the synchronize button is clicked, the choice dialog 72 moves the appropriate handler (e.g., 70₃) from a choice queue 86 into a progress queue 88 associated with the progress dialog 74.

Each handler queue maintains a list of all the handlers in the queue and their states, e.g., whether the synchronization is in progress, synchronization is complete, and so forth. The handler queue is the only object that talks to handler implementations, as every other object sends a request to the handler queue, which passes it along. More particularly, the handler queue forwards requests to a worker thread that in turn calls the handler. This allows each handler to be instantiated on a different thread, independent of the thread that the queue is on. As described above, there is a separate handler queue 86 and 88 respectively associated with the choice and progress dialogs, 72, 74. When a request comes into the event object 78, the event object 78 creates a new, temporary handler queue and adds the appropriate items to synchronize to the newly created queue. The event object 78 then transfers the items from that newly created queue into the appropriate choice handler queue 86 or progress handler queue 88, depending on the event request (manual or automatic). The handler queues support standard AddRef/release methods for lifetime management, and each dialog releases its corresponding handler queue 86 or 88 when the dialog is done with that respective queue.

In accordance with one aspect of the present invention, the synchronization manager 60 calls each handler (e.g., 70₃) in the progress queue 88 to perform the synchronization. As a result, the user does not need to separately run each application to synchronize the data. The way in which synchronization is handled, e.g., the protocol used, how the data is stored, and so on is performed by the handlers, and is independent of the synchronization manager 60. In other words, the synchronization manager 60 provides the dialogs 64 and appropriately invokes the handlers to perform synchronization, but leaves the synchronization up to the handlers (which should best know how to synchronize their own data). Note that in one implementation the handlers are called one at a time, however alternatively, multiple handlers may be called at the same time.

To synchronize, the synchronization manager 60 calls each handler. For example, in the COM implementation, the synchronization manager 60 calls methods of the handler, ordinarily including three methods directed to synchronization. First, the synchronization manager 60 calls an "initialize" method of the handler (e.g., 70₃), e.g., named "ISyncMgrSynchronize::Initialize" to determine if the registered application handler 70₃ wants to handle the synchronize event. If not, then the other two methods are not called. Alternatively, if the handler 70₃ replies that it wants to handle the event, a "prepare" for synchronization method, named "ISyncMgrSynchronize::PrepareForSync" is called by the synchronization manager 60 to give the application a chance to perform any user interface operations and do any necessary initialization before the synchronization. For example, an electronic mail program such as Microsoft® Outlook™ may first need to show a password dialog to the user to obtain proper credentials before logging onto the mail server. The "prepare-for-sync" method call provides the handler 70₃ with this opportunity.

Continuing with the above example, when (and if) the handler 70₃ indicates that it is ready for synchronizing, the Synchronization manager 60 calls an ISyncMgrSynchronize::Synchronize method of the handler. If this method is called, the application synchronizes the items that were specified in the PrepareForSync method. Additional details of the exemplary "ISyncMgrSynchronize::Initialize," the "ISyncMgrSynchronize::PrepareForSync" and the ISyncMgrSynchronize::Synchronize methods are described below.

During synchronization of any data, the progress dialog 74 is displayed for the benefit of the user in order to show the progress of the synchronization. To this end, the progress dialog 74 communicates with the handlers (e.g., 70₃–70₅) in the progress queue 88 by receiving callbacks therefrom to track the state of handlers and items. Note that the event object 78 and choice dialog 72 create (or find if already created) the progress dialog 74 by making a request to the object manager 82, as described above. The progress dialog 74 similarly supports lifetime via reference counting functions on the object manager 82.

In addition to displaying progress information such as the updating the amount of data synchronized, the progress dialog 74 can display error information. For example, a handler directed to synchronizing a website subscription may indicate via a callback the handler was unable to reach the destination, whereby the progress dialog 74 displays the information. The progress dialog 74 may also provide a selection button via which the user can request additional details about an error, whereby the handler can return any desired information via the callback mechanism. Callbacks to the progress dialog 74 from a handler can also be used to obtain additional user information, for example, to display a user interface to resolve a conflict of how data should be synchronized when changed both locally and on the remote source. A retry button may also be provided in the progress dialog 74 via which a user can request a retry of a requested synchronization. If the retry button is clicked, the synchronization manager 60 will repeat the calling of the handler, e.g., via calls to the initialize method, the prepare-for-sync method and the synchronize method, as described above.

Each handler (e.g., 70₁) in the handler queues 86, 88 has a JobInfo object associated therewith to maintain information about the event that triggered the job. To this end, for each request to the event object 78, a JobInfo object is created at the same time the handler queue is created, and the JobInfo is released when all handler instances associated with the job have been released. The JobInfo object includes the information that enables the synchronization manager 60 to keep-track of which handlers are associated with which job (event), e.g., whether the item being synchronized because a schedule fired, because of a logon event, during idle, and so forth. For example, as shown in FIG. 3, HandlerA 70₁ and HandlerB 70₂ in the choice queue are associated with JobInfoA 90₁, HandlerC 70₃ and HandlerD 70₄ in the progress queue 88 are associated with JobInfoB 90₂, and HandlerE 70₅ in the progress queue 88 is associated with JobInfoC 90₃. Note that handlers (e.g., 70₁ and 70₂) may share a JobInfo object when the handlers are queued in response to the same event.

Lastly, as shown in FIG. 3, connection objects (e.g., 92₁–92₂) track the status for any connections (e.g., LAN/WAN) associated with JobInfos. By way of example, certain jobs need one or more connections in order to survive, such as a scheduled job that downloads data through a dial-up connection. When a JobInfo is created, it is given a list of connections on which the job can be run, whereby the JobInfo informs a connection manager 94 of the connections on which the job can be performed. A connection object (e.g., 92₁) is provided for each type of connection, e.g., LAN (local area network) or a RAS (remote access server) dial-up connection. The connection manager 94 also provides a wrapper for WinInet and RAS calls such as InternetDial( ). The connection objects handle their respective connection operations, such as the dialing-up operation. Via reference counts, a connection object (e.g., $90_2$) is removed from the connection manager when no JobInfos are associated therewith, i.e., the connection is maintained for any other job that still needs it and released when no longer needed.

Figure 4:
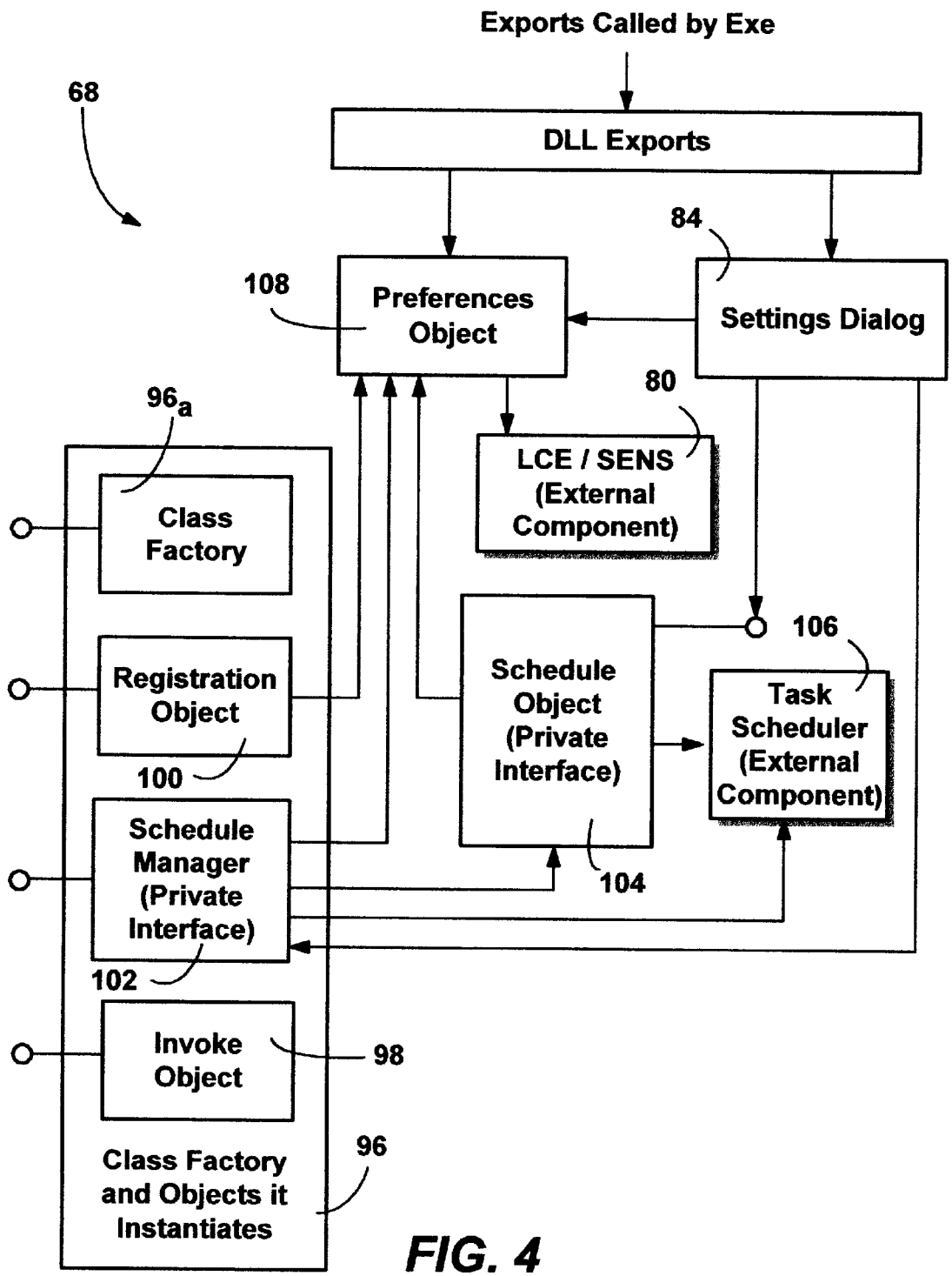
FIG. 4 is a block diagram representing various components for handling various types of data synchronizations in accordance with one aspect of the present invention.

FIG. 4 shows the various components related to the exemplary DLL/COM implementation 68 of the synchronization manager 60. For the DLL implementation 68, a class factory 96 is a standard COM DLL class factory used by handlers $70_1$–$70_n$ to obtain interfaces of an invoke object 98 and a registration object 100. A class factory object 96a is also created. The invoke object 98 implements the ISyncMgrSynchronizeInvoke interface, via which an application can invoke the synchronization manager 60 to do an UpdateAll or update specific items, as described above. The registration object 100 implements the ISyncMgrSynchronizeRegister interface for registering handlers, as also described above. Additional details of the ISyncmgrSynchronizeInvoke and ISyncMgrSynchronizeRegister interfaces and their methods are described below.

The synchronization manager 60 may support user-scheduled automatic synchronizations, by providing a schedule dialog and wizard 64 (FIG. 2) that include user dialogs for showing and configuring logon synchronization preferences, logoff synchronization preferences, idle synchronization preferences and scheduled synchronizations. By way of example, a particular user may schedule an automatic synchronization of local and remote electronic mail messages on each logon, schedule an automatic synchronization of local files with network database files every Thursday at 11:00 PM, and schedule a synchronization of subscriptions during idle times. A set of interfaces may also be provided whereby handlers can set up schedules outside of the user interface of the synchronization manager 60.

A schedule manager 102 implements the management of schedules, and is a private interface obtained off of the main class factory 96. A scheduling object 104 implements the reading and writing of specific schedules as appropriate, and has an interface obtained by calling a method of the schedule manager 102. An external scheduling service such as task scheduler 106 may be used to trigger events, and although external to the DLL implementation 68, is shown in FIG. 4 because it interfaces with the schedule object 104 and the schedule manager 102 to perform scheduled synchronizations. Exemplary synchronization manager scheduling-related interfaces are described below.

The DLL/COM implementation 68 illustrated herein also includes a preferences object 108 comprising a group of functions for reading and writing user preferences related to synchronization. For example, the preference data may be maintained in the system registry, and the preferences object 108 may register with SENS/LCE 80 (which are external components to the DLL implementation 68, but are shown in FIG. 4 for clarity) as appropriate for receiving event notifications, depending on user-entered preferences. Based on the user configuration information, the synchronization manager 60 registers with the System Event Notification Service (SENS) to receive notifications of specific events such as logon/logoff, network connect/disconnect, time schedule and when the machine is idle. For example, SENS will fire an event to notify the synchronization manager 60 of a network connection if the preferences object 108 registers with SENS for such a notification. The DLL implementation 68 also includes the settings dialog 84, described above, via which the user may enter and/or modify various settings.

Figure 5:
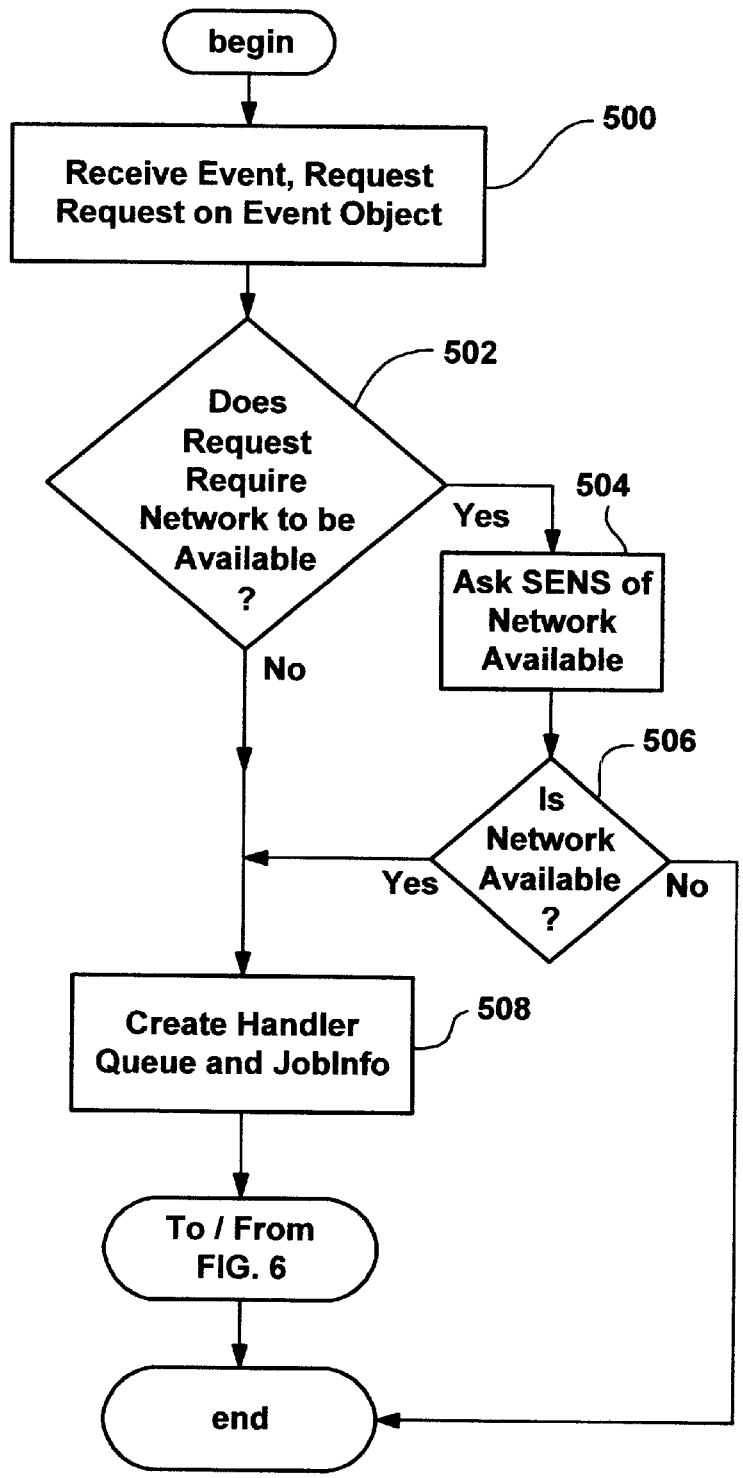
FIGS. 5 and 6 comprise a flow diagram generally representing the steps taken by the synchronization manager to manage the synchronization of data in accordance with one aspect of the present invention.
Figure 6:
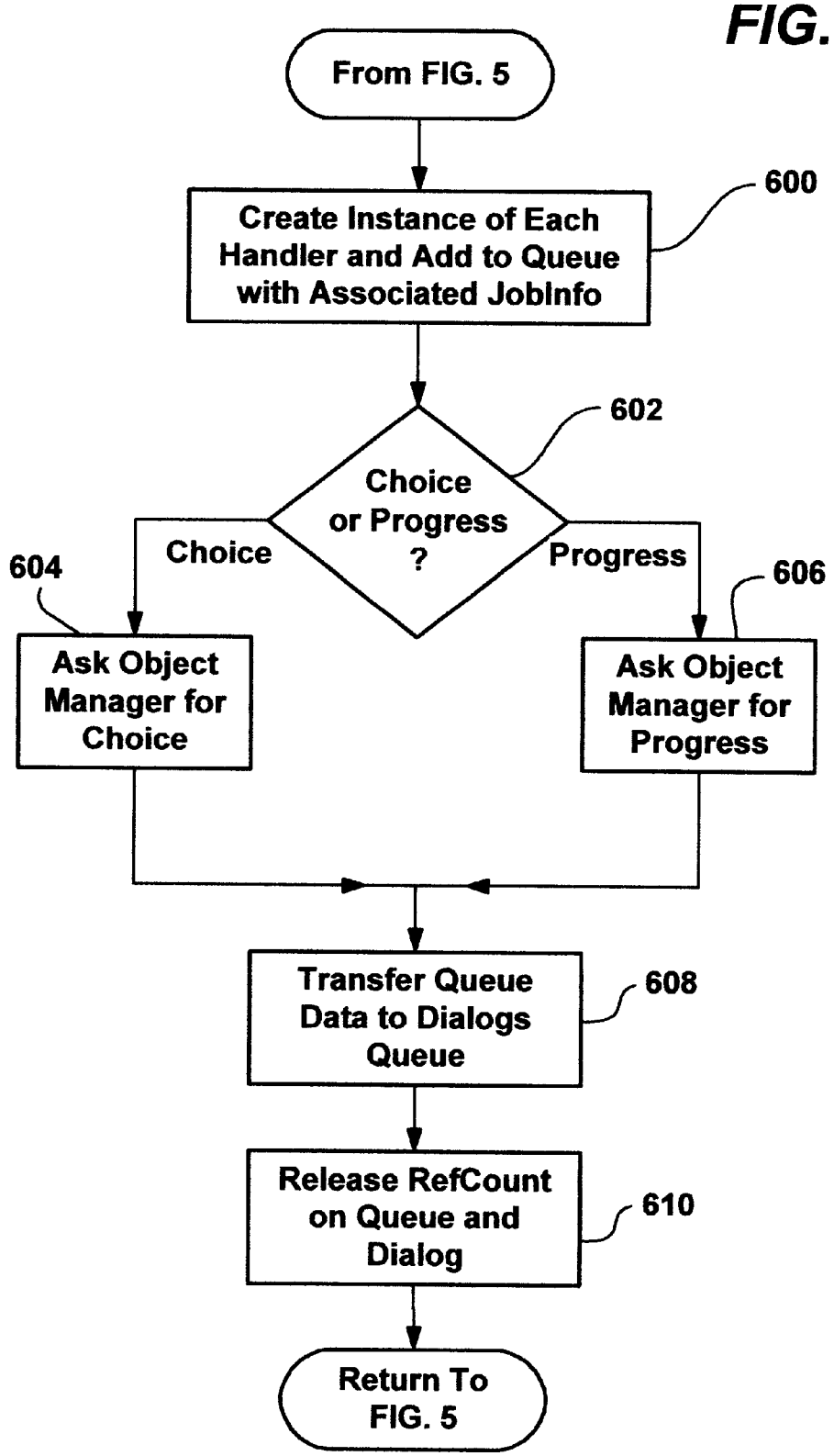

Turning now to an explanation of the present invention with particular reference to FIGS. 5 and 6, beginning at step 500 of FIG. 5, when the synchronization manager 60 receives an event, it requests the event object 78, as described above. The event object 78 along with the user preferences for this event indicates whether the network needs to be available for this request, which is tested for as represented by step 502. If the network is not needed, step 502 branches ahead to step 508 to start the synchronization by creating the (temporary) handler queue and the JobInfo object as described above. Alternatively, if the network is needed, step 502 branches to step 504 which asks SENS if the network is available. Note that SENS is one preferred way to determine network availability, however the synchronization manager 60 may alternatively find out network availability via some other mechanism, including a mechanism of its own. In any event, step 506 evaluates whether the network is available, and if not, the process ends. Note that before ending, the process may first attempt to dial up a connection via a connection object for appropriate events. Also, if the user is manually requesting synchronization, the process may alternatively prompt the user to connect to the network.

If the network is connected at step 506, (or if the network was not needed at step 502), step 508 creates a queue and associated JobInfo object as described above. Step 508 then continues to step 600 of FIG. 6.

At step 600, the synchronization manager 60 creates an instance of each handler and adds that instance along with the associated JobInfo to the queue that was created at step 508. Next, step 602 represents the determination of whether the event needs a choice (manual synchronization) or progress (automatic synchronization) dialog. If a choice dialog 72 is needed, step 604 represents the request to the object manager 82 to find or create the choice dialog 72. If instead a progress dialog 74 is needed, step 606 represents the request to the object manager 82 to find or create the progress dialog 74. Then, as described above, the queue information for each handler is transferred at step 608 to the appropriate (choice or progress) queue of the dialog, and the JobInfo maintained in association therewith. Step 610 represents the releasing of the respective reference counts on the queue and dialog when the handler queue data is moved, which may result in the removal of the temporary handler queue and/or the dialog.

At this time, the appropriate methods (initialize, prepare for sync and synchronize methods) are called as described above, on each queued handler, whereby the application and handler may perform the synchronization according to their own particular needs.

The following sets forth interfaces (in MIDL) that may be used in the exemplary DLL/COM implementation described above. Notwithstanding, there is no intention to limit the present invention to any particular implementation, as alternative implementations are feasible as understood by those skilled in the art. Moreover, the interfaces set forth below are those presently employed, and may change over time.

The Synchronization Manager Interfaces

ISyncMgrSynchronize

Any server that wants to receive synchronization manager notifications implements this interface. The server is instantiated by the synchronization manager in the following way:

```
CoCreateInstance(CLSID_Server,NULL,CLSCTX_INPROC_SERVER,IID_IUnknown,&pUnknown);
pUnknown->QueryInterface(IID_ISyncMgrSynchronize,&pOffLineSynch);
pUnknown->Release( );
typedef GUID SYNCMGRITEMID
[
local,
    object,
    uuid(6295DF40-35EE-11d1-8707-00C04FD93327) // IID_ISyncMgrSynchronize
]
interface ISyncMgrSynchronize: IUnknown
{
    typedef [unique] ISyncMgrSynchronize *LPSYNCMGRSYNCHRONIZE;
    typedef enum_tagSYNCMGRFLAG {                       // flags for Synchronization Event
        SYNCMGRFLAG_CONNECT                             = 0x0001, // Sync was invoked by a network connect
        SYNCMGRFLAG_PENDINGDISCONNECT                   = 0x0002, // Sync was invoked by a pending network disconnect
        SYNCMGRFLAG_MANUAL                              = 0x0003, // Sync was invoked manually
        SYNCMGRFLAG_IDLE                                = 0x0004, // Sync was invoked by an idle event
        SYNCMGRFLAG_INVOKE                              = 0x0005, // Sync was programmatically invoked by handler
        SYNCMGRFLAG_SCHEDULED                           = 0x0006, // Sync was invoked by a scheduled update
        SYNCMGRFLAG_EVENTMASK                           = 0x00FF,
        SYNCMGRFLAG_SETTINGS                            = 0x0100, // Sync was invoked for configuration only
        SYNCMGRFLAG_MAYBOTHERUSER                       = 0x0200, // interaction with the user is permitted
    } SYNCMGRFLAG;
    const USHORT MAX_SYNCMGRHANDLERNAME = 32;
    typedef enum_tagSYNCMGRHANDLERFLAGS {               // flags that apply to this handler.
        SYNCMGRHANDLER_HASPROPERTIES                    = 0x01, // have a properties dialog for this handler
        SYNCMGRHANDLER_MAYESTABLISHCONNECTION           = 0x02, // handler knows how to dial
        SYNCMGRHANDLER_ALWAYSLISTHANDLER                = 0x04, // always list handler as choice
    } SYNCMGRHANDLERFLAGS;
        typedef struct_tagSYNCMGRHANDLERINFO {
        DWORD    cbSize;
        HICON    hIcon;
        DWORD    SyncMgrHandlerFlags;
        WCHAR    wszHandlerName[MAX_SYNCMGRHANDLERNAME];
} SYNCMGRHANDLERINFO, *LPSYNCMGRHANDLERINFO;
cpp_quote("#define SYNCMGRITEMSTATE_UNCHECKED 0x0000")
cpp_quote("#define SYNCMGRITEMSTATE_CHECKED 0x0001")
cpp_quote(" ")
typedef enum _tagSYNCMGRSTATUS {
    SYNCMGRSTATUS_STOPPED        = 0x0000,
    SYNCMGRSTATUS_SKIPPED        = 0x0001,
    SYNCMGRSTATUS_PENDING        = 0x0002,
    SYNCMGRSTATUS_UPDATING       = 0x0003,
    SYNCMGRSTATUS_SUCCEEDED      = 0x0004,
    SYNCMGRSTATUS_FAILED         = 0x0005,
    SYNCMGRSTATUS_PAUSED         = 0x0006,
    SYNCMGRSTATUS_RESUMING       = 0x0007,
} SYNCMGRSTATUS;
HRESULT Initalize([in] DWORD dwReserved, [in] DWORD dwSynMgrFlags, [in] DWORD cbCookie,        [in]
    BYTE const*lpCookie);
HRESULT GetHandlerInfo([out] LPSYNCMGRHANDLERINFO *ppSyncMgrHandlerInfo);
HRESULT EnumSyncMgrItems([out] ISyncMgrEnumItems **ppSyncMgrEnumItems);
HRESULT GetItemObject([in] REFSYNCMGRITEMID ItemID, [in] REFIID riid, [out] void** ppv);
HRESULT ShowProperties([in] HWND hWndParent, [in] REFSYNCMGRITEMID ItemID);
HRESULT SetProgressCallback([in] ISyncMgrSynchronizeCallback *lpCallBack);
HRESULT PrepareForSync([in] ULONG cbNumItems,[in] SYNCMGRITEMID* pItemIDs, [in] HWND hWndParent, [in]
    DWORD dwReserved);
HRESULT Synchronize([in] HWND hWndParent);
HRESULT SetItemStatus([in] REFSYNCMGRITEMID pItemID, [in] DWORD dwSyncMgrStatus);
HRESULT ShowError([in] HWND hWndParent, [in] REFSYNCMGRERRORID ErrorID);
}
```

ISyncMgrSynchronize::Initialize
Called by Synchronization manager to determine if the registered application wants to handle the synchronize event. The application cannot bring up UI (a user interface) within this call. If the application needs to bring up UI before synchronization, it is given a change to do so in the PrepareForSync method.

```
HRESULT Initialize(
[in] DWORD dwReserved,
[in] DWORD dwSyncFlags,
    [in] DWORD cbCookie,
[in] const BYTE *lpCookie
);
```

Parameters
dwReserved
   [in] Reserved Parameter, must be zero dwSyncFlags
   [in] Flags taken from the SYNCFLAG enumeration. The following flags are defined:
      SYNCMGRFLAG_CONNECT—Indicates the synchronization was initiated by a network connect.
      SYNCMGRFLAG_PENDINGDISCONNECT—Indicates the synchronization was initiated by a pending network disconnect.
      SYNCMGRFLAG_MANUAL—Indicates the synchronization was manually initiated by the User
      SYNCMGRFLAG_IDLE—Indicates the synchronization was initiated by an idle event.
      SYNCMGRFLAG_INVOKE—Indicates the synchronization was programmatically initiated by the handler.
      SYNCMGRFLAG_SCHEDULED—Indicates the synchronization was initiated by a scheduled event.
      SYNCMGRFLAG_MAYBOTHERUSER.—If this flag is set the application is allowed to show UI and interact with the user. If this flag is not set, the application does not display any UI other than using the ISynchronizeCallback interface. If an application cannot complete the synchronization without bringing up UI, the application fails the synchronization.
      SYNCMGRFLAG_SETTINGS—Indicates the object was instantiated for configuration purposes in the System Properties dialog. Enumerator will be called to gather item information.
cbCookie
   [in] Size-in bytes of lpCookie data
lpCookie
   [in] Points to the Cookie that the application passed when it programmatically invoked Synchronization Manager.
Remarks
   The SyncFlags apply for the lifetime of the ISyncMgrSynchronize object and are used by the other ISyncMgrSynchronize methods.
   The only exception for bringing up UI within this call is if it is the very first time the registered applications initialized method is called. The application is allowed to bring up any one-time initialization it needs to set up items and introduce the user to the applications feature.
   If the application does not recognize the syncflag event, (i.e., a new one has been defined), it should treat the event as a manual sync.
   A handler should not assume the lpCookie data is NULL if it did not invoke the synchronization. For example, on a schedule invoke the name of the schedule is passed as the cookie data. The handler only controls that value of the data if the sync event is SYNMGRFLAG_INVOKE.

Return Values
   This method supports the standard return values E_INVALIDARG, E_UNEXPECTED, and E_OUTOFMEMORY, as well as the following:
   S_OK
      Initialization was successful.
   S_FALSE
      Application does not want to handle this event. Application returns S_FALSE when it does not want to do anything on the synchronization.
ISyncMgrSynchronize::GetHandlerInfo
Called by the Synchronization manager to obtain handler information

```
HRESULT GetHandlerInfo (
[out] LPSYNCMGRHANDLERINFO *ppSyncMgrHandlerInfo);
```

Parameters
ppSyncMgrHandlerInfo
   [out] returns a pointer to a SyncMgrHandlerInfo Structure
SyncMgrHandlerInfo Structure
Members
cbSize—Set to the size of the structure.
hIcon—Icon of the Handler
SyncMgrHandlerFlags—Flags for Handler.
   SYNCMGRHANDLER_HASPROPERTIES—indicates the ShowProperties method may be called on the handler.
   SYNCMGRHANDLER_MAYESTABLISHCONNECTION—Indicates this handler knows how to dial.
   SYNCMGRHANDLER_ALWAYLISTHANDLER—Handler is shown in choice dialog even if no items are associated with it.
Remarks
Return Values
This method supports the standard return values E_INVALIDARG, E_UNEXPECTED, and E_OUTOFMEMORY, as well as the following:
   S_OK
      Handler Information was returned successfully
ISyncMgrSynchronize:: EnumSyncMgrItems
   Called by the Synchronization manager to return the object's offline items enumerator.

```
HRESULT EnumSyncMgrItems (
([out] ISyncMgrEnumItems **ppenumOffineItems // Returns
Offline Items Enumeratar
);
```

Parameters
ppEnumSyncMgrItems
   [out] if Successful a pointer to a valid ISyncMgrEnumItems interface is returned.
Return Values
   This method supports the standard return values E_INVALIDARG, E_UNEXPECTED, and E_OUTOFMEMORY, as well as the following:
   S_OK
      The enumerator object is successfully instantiated.
   S_SYNCMGR_MISSINGITEMS
      The enumerator object is successfully instantiated but some items are missing. When this success code is returned, Synchronization Manager will not remove any stored preferences for ItemIds not returned in the enumerator.

Remarks

The enumerator object created by this method implements the ISyncMgrEnumItems interface, one of the standard enumerator interfaces that contain the Next, Reset, Clone, and Skip methods. ISyncMgrEnumItems permits the enumeration of the data stored in an array of SYNCMGRITEM structures. Each of these structures provides information on an item that can be prepared for offline operation.

ISyncMgrSynchronize:: GetItemObject

Called by Synchronization Manager to obtain an interface on the requested Servers Items.

```
HRESULT GetItemObject (
[in] SYNCMGRITEMID ItemID,      //Identifies the requested item
[in] REFIID riid,               // Unique identifier for the
                                // requested interface
[out] void** ppv);              //Indirect pointer to the interface
);
```

Parameters
ItemID
  [in] Identifies the requested item.
    riid
  [in] Identifier for the requested interface.
    ppv
  [out] if Successful a pointer to a valid interface.
Return Values
E_NOTIMPL
  The requested interface was not found
Remarks
  This method is for future use. There are currently no interfaces defined on an Item. Application implementers return E_NOTIMPL from this method.
ISyncMgrSynchronize:: ShowProperties
  The Synchronization manager calls this method when the item is selected in the choice dialog box and the user hits the Properties button.

```
HRESULT ShowProperties(
[in] HWND hWndParent,
[in] SYNCMGRITEMID ItemID,
);
```

Parameters
hWndParent
  [in] hwnd that application should use as the Parent of any UI it displays. This value may be NULL.
ItemID
  [in] ItemId that identifies the item to show the properties for.
Return Values
This method supports the standard return values E_INVALIDARG, E_UNEXPECTED, and E_OUTOFMEMORY, as well as the following:
  S_OK
    Properties dialog for this item was handled properly.
Remarks
  If an application provides a properties dialog for an item, it sets the SYNCMGRITEM_HASPROPERTIES bit in the dwFlags of the items enumerator.
  If ItemID is GUID_NULL, the handler should show the Properties for the overall handler.
  The dialog that is displayed should look like a standards Property Page dialog.

If a handler returns any success code, it calls the ShowPropertiesCompleted( ) method on the callback. If a failure code is returned from this method, the handler does not call the ShowPropertiesCompleted method.

ISyncMgrSynchronize:: SetProgressCallback

Synchronization Manager calls this method to set the ProgressCallback Interface. Applications use this callback to give status information from within the PrepareForSync and Synchronize methods.

```
HRESULT SetProgressCallback (
[in] LPOfflineSynchronizeCallback pSyncCallBack,
                                // pointer to callback interface
);
```

Parameters
pSyncCallBack
  [in] Pointer to OfflineSynchronizeCallback interface that the application uses to give Synchronization Manager feedback on its synchronization status and when the synchronization is complete.
Return Values
  This method supports the standard return values E_INVALIDARG, E_UNEXPECTED, and E_OUTOFMEMORY, as well as the following:
  S_OK
    Synchronization was successful.
Remarks
  Applications AddRef the pSyncCallback interface and use it in the other methods to provide status text and progress indicator feedback.
  If the Application already has a pSyncCallback interface when the method is called, it first releases the old interface and then addreff and hold onto the new interface.
  Before the ISyncMgrSynchronize object is released, Synchronization Manager will call this method with pSyncCallBack set to NULL. The application should release the pSyncCallback interface previously passed.
ISyncMgrSynchronize::PrepareForSync
  Called by the synchronization manager to give the application a chance to show any UI and do any necessary initialization before the Synchronize method is called. For example, Microsoft® Outlook™ may need to show the password dialog to the User to log onto the mail server.
  Handlers should return as soon as possible from PrepareForSync and then call the ISyncMgrSynchronizeCallback:: PrepareForSyncCompleted ( ) method. It is legal for the Handler to make the PrepareForSyncCompleted call before returning from this method. If an error code is returned from from the PreapreForSync call the handler should not call the PrepareForSyncCompleted method.

```
HRESULT PrepareForSync (
[in] ULONG cbNumItems,
[in] SYNCMGRITEMID*ItemIDs,
[in] HWND hwndParent,            // Parent hwnd for UI.
[in] DWORD dwReserved
);
```

Parameters
cbNumItems
  [in] Number of Items in the ItemIds array.
    ItemIDs
  [in] Array of ItemIDs that the EndUser has selected to synchronize.
    hwndParent

[in] hwnd that application should use as the Parent of any UI it displays. This value may be NULL.
dwReserved

[in] Reserved Parameter. Applications should ignore this value.

Return Values

This method supports the standard return values E_INVALIDARG, E_UNEXPECTED, and E_OUTOFMEMORY, as well as the following:

S_OK

Preparation was successful.

Remarks

Applications should only show UI if the SYNCMGRFLAG_MAYBOTHERUSER.flag was set in the dwSyncFlags parameter of Initialize. If an application cannot prepare for the synchronization without showing UI when this flag is not set, it should return S_FALSE for the hr parameter of the PrepareForSyncCompleted method in the callback interface.

The array of ItemIDs that are passed into this method also apply to the synchronize method.

The Callback methods can be called on any thread.

ISyncMgrSynchronize::Synchronize

The Synchronization manager calls this method once for each selected group after the user has selected what applications should be synchronized. If the user did not select any of the application's item choices, the application's synchronize method will not be called and the interface will be released. If this method is called, the application synchronizes the items that were specified in the PrepareForSync( ) method.

Handlers should return as soon as possible from Syncrhonize method and then call the ISyncMgrSynchronizeCallback::SynchronizeCompleted ( ) method. It is legal for the Handler to make the SynchronizeCompleted call before returning from this method. If a handler returns a failure code from Synchronize, it should not call the SynchronizeCompleted method.

The application gives progress feedback and checks if the synchronization should be cancelled by using the pSynchCallBack interface pass previously in the SetProgressCallback method.

```
HRESULT Synchronize (
in] HWND hWndParent,        // Parent hwnd for UI.
);
```

Parameters hwndParent

[in] hwnd that application should use as the Parent of any UI it displays. This value may be NULL.

Return Values

This method supports the standard return values E_INVALIDARG, E_UNEXPECTED, and E_OUTOFMEMORY, as well as the following:

S_OK

Synchronization was successful.

Remarks

Applications provide progress information even if the SYNCMGRFLAG_MAYBOTHERUSER was not specified in Initialize.

Applications should make every attempt not to show UI from within the synchronize method. Any UI should be shown in the PrepareForSync and ShowError methods so the end user experience is to see the UI to logon or specify shares to be synced, then the synchronization can be performed without any user intervention. After the synchronization is complete, conflicts or other error messages can be shown.

The Callback methods can be called on any thread.

ISyncMgrSynchronize::SetItemStatus

Called by the synchronization manager to change the status of an item in between the time that the handler has returned from PrepareForSync and called the PrepareForSyncCompleted callback method, or has returned from Synchronize but has not yet called the SynchronizeCompleted callback method.

```
HRESULT SetItemStatus (
[in] SYNCMGRITEMID ItemID,      // Identifies the Item status should effect
[in] DWORD dwSyncMgrStatus,     // Status to set the item too.
Taken from the SYNCMGRSTATUS enumeration
);
```

Parameters

ItemID

[in] Identifies the Item dwSyncMgrStatue

[in] Status to set the item too. Taken from the SYNCMGRSTATUS enumeration.

Return Values

This method supports the standard return values E_INVALIDARG, E_UNEXPECTED, and E_OUTOFMEMORY, as well as the following:

S_OK

Status was set.

Remarks

Currently the only status passed is SYNCMGRSTATUS_SKIPPED and SYNCMGRSTATUS_STOPPED, to skip and stop an item, respectively. When a handler receives this, it should skip or stop the item specified.

ISyncMgrSynchronize::ShowError

Called by the Synchronization manager when the user double-clicks on the associated message in the Error tab.

Handlers should return as soon as possible from ShowError method and then call the ISyncMgrSynchronizeCallback::ShowErrorCompleted ( ) method. It is legal for the handler to make the ShowErrorCompleted call before returning from this method. If a handler returns a failure code from ShowError it should not call the ShowErrorCompleted method.

```
HRESULT ShowError (
[in] HWND hWndParent,       // Parent hwnd for UI.
[in] DWORD dwErrorID,       // Parent hwnd for UI.
);
```

Parameters hwndParent

[in] hwnd that application should use as the Parent of any UI it displays. This value may be NULL.

dwErrorID

[in] ErrorID associated with this Error message. The ErrorID value is what was passed in the ISyncMgrSynchronizeCallback::LogError( ) method.

Return Values

This method supports the standard return values E_INVALIDARG, E_UNEXPECTED, and E_OUTOFMEMORY, as well as the following:

S_OK

Call completed Successfully.

Remarks

The ShowError method is called when the user double-clicks on the associated error in the error tab. This gives the application an opportunity to display a dialog informing the end user what error occurred or other feedback.

Applications may show UI in this method even if the SYNCMGRFLAG_MAYBOTHERUSER flag was not set in the dwSyncFlags parameter of the Initialize method. Applications still call EnableModeless and check the return code before showing UI.

ISyncMgrSynchronizeCallback

Implemented by the Synchronization manager to allow application to give status feedback and determine if the operation should continue.

```
[
    local,
    object,
    uuid(6295DF41-35EE-11d1-8707-00C04FD93327) // IID_ISyncMgrSynchronizeCallback
]
interface ISyncMgrSynchronizeCallback: IUnknown
{
    typedef [unique] ISyncMgrSynchronizeCallback *LPSYNCMGRSYNCHRONIZECALLBACK;
    cpp_quote("#define SYNCMGRPROGRESSITEM_STATUSTEXT    0x0001")
    cpp_quote("#define SYNCMGRPROGRESSITEM_STATUSTYPE    0x0002")
    cpp_quote("#define SYNCMGRPROGRESSITEM_PROGVALUE     0x0004")
    cpp_quote("#define SYNCMGRPROGRESSITEM_MAXVALUE      0x0008")
    cpp_quote(" ")
    typedef struct_tagSYNCMGRPROGRESSITEM {
        DWORD          cbSize;
        UINT           mask;
        const WCHAR*   lpcStatusText;
        DWORD          dwStatusType;
        INT            iProgValue,
        INT            iMaxValue;
    } SYNCMGRPROGRESSITEM, *LPSYNCMGRPROGRESSITEM;
    typedef enum_tagSYNCMGRLOGLEVEL {
        SYNCMGRLOGLEVEL_INFORMATION   = 0x0001,
        SYNCMGRLOGLEVEL_WARNING       = 0x0002,
        SYNCMGRLOGLEVEL_ERROR         = 0x0003,
    } SYNCMGRLOGLEVEL;
    cpp_quote("#define SYNCMGRLOGERROR_ERRORFLAGS    0x0001")
    cpp_quote("#define SYNCMGRLOGERROR_ERRORID       0x0002")
    cpp_quote("#define SYNCMGRLOGERROR_ITEMID        0x0004")
    cpp_quote(" ")
    typedef enum_tagSYNCMGRERRORFLAGS { // flags that apply to the error.
        SYNCMGRERRORFLAG_ENABLEJUMPTEXT  = 0x01,     // ShowErrors should be called on this item.
    }SYNCMGRERRORFLAGS;
    typedef struct_tagSYNCMGRLOGERRORINFO {
        DWORD            cbSize;
        DWORD            mask;
        DWORD            dwSyncMgrErrorFlags;
        SYNCMGRERRORID   ErrorID;
        SYNCMGRITEMID    ItemID;
    }SYNCMGRLOGERRORINFO, *LPSYNCMGRLOGERRORINFO;
    HRESULT ShowPropertiesCompleted([in] HRESULT hr);
    HRESULT PrepareForSyncCompleted([in] HRESULT hr);
    HRESULT SynchronizeCompleted([in] HRESULT hr);
    HRESULT ShowErrorCompleted([in] HRESULT hr, [in] ULONG cbNumItems, [in] SYNCMGRITEMID *pItemIDs);
    HRESULT EnableModeless([in] BOOL fEnable);
    HRESULT Progress([in] REFSYNCMGRITEMID pItemID [in] LPSYNCMGRPROGRESSITEM lpSyncProgressItem);
    HRESULT LogError([in] DWORD dwErrorLevel, [in] const WCHAR *lpcErrorText, [in] LPSYNCMGRLOGERRORINFO
            lpSyncLogError);
    HRESULT DeleteLogError([in] REFSYNCMGRERRORID ErrorID, [in] DWORD dwReserved);
    HRESULT EstablishConnection([in] WCHAR const * lpwszConnection, [in] DWORD dwReserved);
}
```

SYNCMGRPROGRESSITEM Structure
Members
  cbSize—Set to the size of the ProgressItem structure.
  mask—A set of bit flags that specify attributes of this data structure or of an operation that is using this structure. The following bit flags specify the members of the SYNCMGRPROGRESSITEM structure that contain valid data. One or more of these bit flags may be set:

| Value | Meaning |
| --- | --- |
| SYNCMGRPROGRESSITEM_STATUSTEXT | The StatusText member is valid. |
| SYNCMGRPROGRESSITEM_PROGVALUE | The ProgValue member is valid. |
| SYNCMGRPROGRESSITEM_MAXVALUE | The MaxValue member is valid. |

LpcStatusText—Text for updating the status text associated with an item.
  lProgValue—Indicates what to set the ProgressBar value to for an Item
  lMaxValue—Value for setting the Progress Bar Max Value for an Item
ISyncMgrSynchronizeCallback::Progress
  Called by the application to update the progress feedback and determine if the operation should continue.

```
HRESULT Progress(
    [in] SYNCMGRITEMID ItemID,
        [in] LPSYNCMGRPROGRESSITEM lpSyncProgressItem
);
```

Parameters
ItemID
  [in] ItemId that identifies the item the Progress information applies too.
  lpSyncProgressItem
  [in] Pointer to SYNCMGRPROGRESSITEM structure containing the progress information.
Return Values
S_OK
  Continue the operation.
S_SYNCMGR_CANCELITEM
  Cancel the operation on the ItemID specified in the ItemID parameter as soon as possible
S_SYNCMGR_CANCELALL
  Cancel the operation on all items associated with this object as soon as possible.
Remarks
  Applications should call this to provide normal feedback even then the SYNCMGRFLAG_MAYBOTHERUSER is specified.
  Applications should call the Progress method as often as possible to provide feedback to the User.
ISyncMgrSynchronizeCallback:: ShowPropertiesCompleted
  Called by the handler before and after its ShowProperties operation has been completed.
HRESULT ShowPropertiesCompleted (HRESULT hrResult);
Parameters
hrResult
  [in] indicates if ShowPreoperties was successful.

Return Values
S_OK
  Properties dialog was dismissed normally.
S_SYNCMGR_ITEMDELETED
  The Items whose property sheet being displayed has been deleted.
S_SYNCMGR_ENUMITEMS
  When this success code is returned, the synchronization manager will re-enumerate the handler's items.
Remarks
  It is legal for the handler to call this method before returning from the ISyncMgrSynchronize::ShowProperties method.
  The only time the handler should not call this method if it does not return a success code from the ShowProperties method.
ISyncMgrSynchronizeCallback::PrepareForSyncCompleted
  Called by the handler before and after its PrepareForSync operation has been completed

```
HRESULT PrepareForSyncCompleted(
HRESULT hrResult
);
```

Parameters
hrResult
  [in] indicates if PrepareForSync was successful. If S_OK is returned the handlers synchronize method will be called. If the hrResult is set to anything but S_OK the handler will be released without its synchronize method being called.
Return Values
S_OK
Remarks
  A handler should return as soon as possible from the ISyncMgrSynchronize::PrepareForSync method and then call this method to let Synchronization Manager know that it has completed processing the PrepareForSync call.
  It is legal for the handler to call this method before returning from the ISyncMgrSynchronize::PrepareForSync method.
  The only time the handler should not call this method if it does not return a success code from the PrepareForSync method.
ISyncMgrSynchronizeCallback::SynchronizeCompleted
  Called by the application before and after it displays a dialog from within the PrepareForSync, and Synchronize methods.

```
HRESULT SynchronizeCompleted(
HRESULT hrResult
);
```

Parameters
hrResult
  [in] indicates if Synchronize was successful.
Return Values
S_OK
Remarks
  A handler should return as soon as possible from the ISyncMgrSynchronize::Synchronize method and then call this method to let the Synchronization manager know that it has completed processing the Synchronize call.
  It is legal for the handler to call this method before returning from the ISyncMgrSynchronize::Synchronize method.

The only time the handler should not call this method if it does not return a success code from the Synchronize method.

ISyncMgrSynchronizeCallback:: ShowErrorCompleted

Called by the handler before and after its PrepareForSync operation has been completed.

HRESULT ShowErrorCompleted([in] HRESULT hr,[in] ULONG cbNumItems
    [in] SYNCMGRITEMID *pItemIDs);

Parameters
hrResult
[in] indicates if ShowError was successful. If hrResult is S_SYNCMGR_RETRYSYNC when the handler wants Synchronization Manager to retry the synchronization. When this value is returned to Synchronization Manager both the PrepareForSync( ) and Synchronize methods will be called again.
    cbNumItems
[in] Indicates the number ItemIds in the pItemIDs arg. This parameter is ignored unless hrResult is S_SYNCMGR_RETRYSYNC.
    pItemIDs
[in] pointer to array of ItemIds to pass to PrepareForSync on a retry. This parameter is ignored unless hrResult is S_SYNCMGR_RETRYSYNC.
Return Values
S_OK
Remarks Since pItemIDs is an in parameter the caller owns the memory pointed to by pItemIDs. The Synchronization manager will make a copy of the array before returning.

A handler should return as soon as possible from the ISyncMgrSynchronize::ShowError method and then call this method to let Synchronization Manager know that it has completed processing the ShowError call.

It is legal for the handler to call this method before returning from the ISyncMgrSynchronize::ShowError method.

The only time the handler should not call this method if it does not return a success code from the Showerror method.

ISyncMgrSynchronizeCallback::EnableModeless

Called by the application before and after they display a dialog from within the PrepareForSync and Synchronize methods.

```
HRESULT EnableModeless(
[in] BOOL fEnable
);
```

Parameters
fEnable
    [in] Indicates if application is requesting permission to display a dialog or is done displaying the dialog.
Return Values
S_OK
    Continue the operation.
S_FALSE
    The dialog box should not be displayed.
Remarks To request permission to display a dialog, the application first calls EnableModeless (TRUE). If S_OK is returned, the application can go ahead and display the dialog. After the dialog box has been displayed, the application must call EnableModeless (FALSE) to let the Synchronization manager know that it is okay to let other items display a dialog.

It is not necessary for a handler to call EnableModeless in response to a ShowProperties or ShowErrors method call.

SYNCMGRLOGERRORINFO Structure

Members
    cbSize—Set to the size of the LogErrorInfo Struture.
    mask—A set of bit flags that specify attributes of this data structure or of an operation that is using this structure.

The following bit flags specify the members of the SYNCMGRLOGERRORINFO structure that contain valid data. One or more of these bit flags may be set:

| Value | Meaning |
|---|---|
| SYNCMGRLOGERROR_ERRORID | ErrorID member is valid |
| SYNCMGRLOGERROR_ITEMID | ItemID member is valid. | dwErrorID—Indicates application can display additional details or can take some action related to this error. When this item is set and the User clicks on the error in the results pane the applications ShowError( ) method will be called passing back this ErrorID.
    ItemID—Indicates to which item this error applies. If the mask bit is not set or t he ItemID is GUID_NULL, the message is interpreted to apply to all items.

```
#define SYNCMGRLOGERROR_ERRORID     0x0001
#define SYNCMGRLOGERROR_ITEMID      0x0002
typedef struct_tagSYNCMGRLOGERRORINFO {
    DWORD mask;
    DWORD dwErrorID;
    SYNCMGRITEMID ItemID;
} SYNCMGRLOGERRORINFO, *LPSYNCMGRLOGERRORINFO;
```

ISyncMgrSynchronizeCallback::LogError

Called by the application to log an information, warning, or error message into the Error tab on the Synchronization Manager status dialog.

```
HRESULT LogError(
[in] SYNCMGRLOGLEVEL dwErrorLevel,
[in] WCHAR * lpcErrorText,
[in] LPSYNCMGRLOGERRORINFO lpSyncLogError
);
```

Parameters
dwErrorLevel
    [in] Indicates the error level. Value taken from the SYNCMGRLOGLEVEL enumeration.
lpErrorText
    [in] ErrorText to be displayed in the Error tab.
lpSyncLogError
    [in] Pointer to SYNCMGRLOGERRORINFO structure containing additional error information. Applications that do not provide this data can pass in NULL for this parameter.
Return Values This method supports the standard return values E_INVALIDARG, E_UNEXPECTED, and E_OUTOFMEMORY, as well as the following:
    S_OK
        The Item was successfully logged ISyncMgrSynchronizeCallback:: DeleteLogError Called by the handler to delete a previously logged error information, warning, or error message into the Error tab on the Synchronization Manager status dialog.

---

HRESULT DeleteLogError(
    [in] REFSYNCMGRERRORID ErrorID,
    [in] DWORD dwReserved);

---

Parameters
ErrorID
    [in] Identifies logError to be deleted. If ErrorID is GUID_NULL all errors logged by the instance of the handler will be deleted.
dwReserved
    [in] Reserved for future use. Must be set to zero.
Return Values
    This method supports the standard return values E_INVALIDARG, E_UNEXPECTED, and E_OUTOFMEMORY, as well as the following:
      S_OK
        The Item was successfully deleted from the log.

ISyncMgrSynchronizeCallback::EstablishConnection

Called by the handler to when it wants to establish a connection.
HRESULT EstablishConnectoin(
    [in] WCHAR const *lpwszConnection,
    [in] DWORD dwReserved);
Parameters
lpwszConnection
    [in] Identifies the name of the Connection to dial
dwReserved
    [in] Reserved for future use. Must be set to zero.
Return Values
    This method supports the standard return values E_INVALIDARG, E_UNEXPECTED, and E_OUTOFMEMORY, as well as the following:
      S_OK
        The Connection was established.

Remarks

If lpwszConnection is null, then it means that Synchronization Manager should use the default autodial connection.

When an instance of EstablishConnection is called by a handler then Synchronization Manager will try to establish the connection. If a subsequent EstablishConnection is called, then the Synchronization manager will attempt the new connection without hanging up the previous connection. Connections will remain until all handlers have finished synchronizing. After all handlers have synchronized then any connections established by the Synchronization manager will be closed.

Handlers should only attempt to establish a connection on a manual or invoked synchronization.
ISyncMgrEnumItems The ISyncMgrEnumItems interface is used to enumerate through an array of SYNCMGRITEM structures. Each of these structures provides information on an item that can be prepared for offline operation. ISyncMgrEnumItems has the same methods as all enumerator interfaces: Next, Skip, Reset, and Clone.

---

```
const USHORT MAX_SYNCMGRITEMNAME = 128;
typedef enum_tagSYNCMGRITEMFLAGS { // flags for this OfflineItem
    SYNCMGRITEM_HASPROPERTIES    = 0x01, // have a properties dialog for this item
    SYNCMGRITEM_TEMPORARY        = 0x02, // Item is a temporary item.
    SYNCMGRITEM_ROAMINGUSER      = 0x04, // This item should roam with the User
    SYNCMGRITEM_LASTUPDATETIME   = 0x08, // Indicates lastUpdateTime Field is valid
}SYNCMGRITEMFLAGS;
typedef struct_tagSYNCMGRITEM {
    DWORD cbSize;
    SYNCMGRITEMID ItemID;
    DWORD dwItemState;
    HICON hIcon;
    DWORD dwItemFlags;
    WCHAR wszItemName[MAX SYNCMGRITEMNAME];
    FILETIME ftLastUpdate;
}SYNCMGRITEM, *LPSYNCMGRITEM;
interface ISyncMgrEnumItems: IUnknown
{
HRESULT Next([in] ULONG celt, [out]LPSYNCMGRITEM rgelt, [out] ULONG *pceltFetched);
HRESULT Skip([in] ULONG celt);
HRESULT Reset( );
HRESULT Clone([out] ISyncMgrEnumItems **ppenum);
}
typedef [unique] ISyncMgrEnumItems *LPENUMSYNCMGRITEMS;
```

---

SYNCMGRITEM Structure
Members
    cbSize—Size of the SYNCMGRITEM structure.
    ItemID—ItemID for this item.
    dwItemState—Intial Item State. Used by Synchronization Manager if this is a new ItemID as the items initial value.
    hIcon—Small Icon used to display next to item in the choice dialog
    dwFlags—ItemFlags. Only flag currently defined is
      SYNCMGRITEM_HASPROPERTIES—indicates the ShowProperties method may be called on the item.
      SYNCMGRITEM_TEMPORARY—indicates that Synchronization Manager that this item is only valid for this instantiation and no preferences should be saved.
      SYNCMGRITEM_ROAMINGUSER—Indicates that this item should roam with the User.

SYNCMGRITEM_LASTUPDATETIME—Indicates lastUpdateTime Field is valid wszItemName—Description of the Item to display in the Choice dialog.

ftLastUpdate—Filetime of the last time the item was synchronized. The time is expressed in Coordinated Universal Time (UTC).

Remarks

The ItemID needs to be the same for an item each time the object is created and uniquely identify the object.

ISyncMgrSynchronizeInvoke

An application can invoke the synchronization manager to do an UpdateAll or update specific items using the ISyncMgrSynchronizeInvoke interface.

An application obtains this interface by doing the following:

---

```
CoCreateInstance(CLSID_SYNCMGR,NULL,CLSCTX_ALL,IID_IUnknown,&pUnknown);
pUnknown->QueryInterface(IID_ISyncMgrSynchronizeInvoke,&pSyncInvoke););
// call appropriate synchronization method.
pSyncInvoke->Release( );
pUnknown->Release( );
typedef enum_tagSYNCMGRINVOKEFLAGS { // flags for this OfflineItem
    SYNCMGRINVOKE_STARTSYNC  = 0x02, // Immediately start the sync without displaying choices
    SYNCMGRINVOKE_MINIMIZED  = 0x04, // Dialog should be minimized by default
}SYNCMGRINVOKEFLAGS;
interface ISyncMgrSynchronizeInvoke: IUnknown
{
    HRESULT UpdateItems(([in] dwInvokeFlags, [in] REFCLSID rclsid, [in] DWORD cbCookie,
        [in] const BYTE* lpCookie);
    void UpdateAll( );
};
```

---

ISyncMgrSynchronizeInvoke::UpdateItems

```
HRESULT UpdateItems(
[in] DWORD dwInvokeFlags,
    [in] REFCLSID rclsid,
    [in] DWORD cbCookie,
[in] const BYTE* lpCookie,
);
```

Parameters dwInvokeFlags

[in] Indicates how the item should be invoked.

SYNCMGRINVOKE_STARTSYNC—When this flag is set Synchronization Manager will immediately start the synchronization without first displaying the choices to the User.

SYNCMGRINVOKE_MINIMIZED—The dialog should be initially displayed as minimized. Note: this flag will not change the state of the dialog if it already exists.

rclsid

[in] CLSID of the application that should be invoked to handle the Update.

cbCookie

[in] Size in bytes of lpCookie data lpCookie

[in] Points to the private Cookie that Synchronization Manager should pass to the Initialize method of the calling application. This information can be anything the application needs such as a list of shares in the case of CSC.

Return Values

This method supports the standard return values E_INVALIDARG, E_UNEXPECTED, and E_OUTOFMEMORY, as well as the following:

S_OK

The synchronization was successfully

E_FAIL

Errors occurred during the synchronization

ISyncMgrSynchronizeInvoke::UpdateAll

Called by an application to programmatically start an Update All. Update All will return immediately and the Synchronization manager will perform the synchronization in a separate process from the Calling application.

---

```
void UpdateAll(
);
```

---

Parameters none

Registering to Participate in Synchronization Manager

A synchronization handler is a COM Inproc32 Dll. To register with the synchronization manager, the Stadard COM Activation keys need to be registered.

The first time a User makes an item available for offline, the application code should call the Synchronization Manager's RegisterSyncMgrHandler( ) method. When there are no longer any items available offline the UnregisterSyncMgrHandler( ) method should be called.

An application obtains this interface by doing the following:

```
CoCreateInstance(CLSID_SYNCMGR,NULL, CLSCTX_ALL,IID_IUnknown,&pUnknown);
pUnknown->QueryInterface(IID_ISyncMgrRegister,&pSyncRegister);
// call appropriate synchronization method.
pSyncRegister->Release( );
pUnknown->Release( );
[
    local,
    object,
    uuid(6295DF42-35EE-11d1-8707-00C04FD93327), // IID_ISyncMgrSynchronizeRegister
    pointer_default(unique)
]
interface ISyncMgrRegister: IUnknown
{
typedef [unique] ISyncMgrRegister *LPSYNCMGRREGISTER;
typedef enum_tagSYNCMGRREGISTERFLAGS {
    SYNCMGRREGISTERFLAG_CONNECT              = 0x01, // Register to receive Connect Events
    SYNCMGRREGISTERFLAG_PENDINGDISCONNECT    = 0x02, // Register to receive Disconnect Events
    SYNCMGRREGISTERFLAG_IDLE                 = 0x04, // Register to receive Idle Events
}SYNCMGRREGISTERFLAGS;
HRESULT RegisterSyncMgrHandler([in] REFCLSID rclsidHandler, [in] WCHAR const* pwszDescription,
    [in] DWORD dwSyncMgrRegisterFlags);
HRESULT UnregisterSyncMgrHandler([in] REFCLSID rclsidHandler, [in] DWORD dwReserved);
HRESULT GetHandlerRegistrationInfo([in] REFCLSID rclsidHandler, [in,out] LPDWORD pdwSyncMgrRegisterFlags);
}
```

ISyncMgrRegister::RegisterSyncMgrHandler

A handler should call this method to register with the synchronization manager when it has items to synchronize.

HRESULT RegisterSyncMgrHandler(
[in] REFCLSID rclsid,
[in] WCHAR const *pwsDescription,
[in] DWORD dwSyncMgrRegisterFlags
);

Parameters
rclsid
   [in] CLSID of the handler that should be registered to do synchronizations
pwsDescription
   [in] Text identifying the handler. This parameter may be NULL.
dwRegisterFlags
   [in] Set if handler wants the specified event turned on by default for a User. These defaults only apply to LAN connections. Most handlers will pass zero for this value. If a handler sets one of these values, it needs to ensure that it only calls register the first time an item is made available offline so that it does not keep resetting the user's preference.
      SYNCMGRREGISTERFLAG_CONNECT—
         indicates Connect events should be turned on for the User.
      SYNCMGRREGISTERFLAG_
         PENDINGDISCONNECT—indicates Logoff events should be turned on for the User.
      SYNCMGRREGISTERFLAG_IDLE—indicates Idle events should be turned on for the User.
Return Values
This method supports the standard return values E_INVALIDARG, E_UNEXPECTED, and E_OUTOFMEMORY, as well as the following:
   S_OK
      The handler was successfully registered.
ISyncMgrRegister:: UnregisterSyncMgrHandler
   Called by the handler to remove its CLSID from the registration. A handler should call this when it no longer has any items to synchronize.

HRESULT UnregisterSyncMgrHandler(
[in] REFCLSID rclsidHandler,
[in] DWORD dwReserved
);

Parameters
rclsid
   [in] CLSID of the handler that should be unregistered
dwReserved
   [in] Reserved for future use. Must be zero.
Return Values
This method supports the standard return values E_INVALIDARG, E_UNEXPECTED, and E_OUTOFMEMORY, as well as the following:
   S_OK
      The handler was successfully removed from being registered with Synchronization Manager.
ISyncMgrRegister:: GetHandlerRegistrationInfo
   Called by the handler to get current registration information.

HRESULT GetHandlerRegistrationInfo(
[in] REFCLSID rclsidHandler,
[in, out] LPDWORD pdwSyncMgrRegisterFlags
);

Parameters
rclsid
   [in] CLSID of the handler that should be unregistered
pdwSyncMgrRegisterFlags
   [in,out] Returns registration flags.
Return Values
This method supports the standard return values E_INVALIDARG, E_UNEXPECTED, and E_OUTOFMEMORY, as well as the following:
   S_OK
      Call succeeded and Handler is registered
   S_FALSE
      Handler is not registered.
The Synchronization Manager Scheduling Interfaces
ISyncScheduleMgr
   Applications use the methods of the ISyncScheduleMgr interface to schedule synchronization objects.

```
typedef GUID    SYNCSCHEDULECOOKIE;
    ISyncScheduleMgr::CreateSchedule
    HRESULT CreateSchedule(
            [in]        LPCWSTR pwszScheduleName,
            [in]        DWORD dwFlags,
            [in, out]   SYNCSCHEDULECOOKIE *pSyncSchedCookie,
            [out]       ISyncSchedule. **ppSyncSchedule);
    Creates a new Scheduled Synchonization Object.
```

Returns one of the following values:

| | |
|---|---|
| S_OK | The operation was successful. |
| ERROR_ALREADY_EXISTS* | A schedule with the specified SYNCSCHEDULECOOKIE already exists. |
| SYNCMGR_E_NAME_IN_USE | A schedule with the specified name is already in use. |
| E_INVALIDARG | One or more of the arguments are not valid. |
| E_OUTOFMEMORY | Not enough memory is available to complete the operation. | pSyncSchedCookie: GUID that specifies the new sync schedule's GUID. Applications use this GUID to for future identification of this sync schedule object.
  If the [in] parameter is not GUID_NULL, CreateSchedule will try to create a new schedule with the specified SYNCSCHEDULECOOKIE. If the specified schedule already exists, this method will return ERROR_ALREADY_EXISTS.
  If this [in] parameter is GUID_NULL, CreateSchedule will fill in the [out] SYNCSCHEDULECOOKIE with that of the newly created schedule.
pwszScheduleName: LPCWSTR that specifies the new Synchronization Schedule Object's friendly name. This friendly name must be unique. If the name is already being used by and existing schedule, this method will return SYNCMGR_E_NAME_IN_USE, and fill in the Cookie with the GUID of the schedule using this name.
ppSyncSchedule: Address of an interface pointer that receives the requested interface.
dwFlags: Indicates whether the sync schedule should be editable, or if this schedule relies on a predefined schedule.
*Note: Errors will be returned in HRESULT_FROM_WIN32 format.

```
ISyncScheduleMgr::LaunchScheduleWizard
    HRESULT LaunchScheduleWizard(
            [in]        HWND hParent,
            [in]        DWORD dwFlags,
            [in, out]   SYNCSCHEDULECOOKIE *pSyncSchedCookie,
            [out]       ISyncSchedule ** ppSyncSchedule);
Launches the Scheduled Synchronization Wizard for creating a new sync schedule Object.
```

Returns one of the following values:

| | |
|---|---|
| S_OK | The operation was successful. |
| E_INVALIDARG | One or more of the arguments are not valid. |
| S_FALSE | The user hit CANCEL |
| E_OUTOFMEMORY | Not enough memory is available to complete the operation. | hParent: Handle to the parent window of the configuration properties window.
pSyncSchedCookie: GUID that specifies the new sync schedule's GUID. Applications use this GUID to for future identification of this sync schedule object.
  If the [in] parameter is not GUID_NULL, and the specified schedule exists, LaunchScheduleWizard will run through the wizard, using the existing information specified on the SYNCSCHEDULECOOKIE as the default values.
  If this [in] parameter is GUID_NULL, LaunchScheduleWizard will fill in the [out] SYNCSCHEDULECOOKIE with that of the newly created schedule.
ppSyncSchedule: If the schedule wizard is successfully completed, this parameter receives the address of an interface pointer for the newly created schedule. If the wizard is cancelled or fails, this parameter is NULL.
dwFlags: Reserved for future use.

ISyncScheduleMgr::OpenSchedule
    HRESULT OpenSchedule(
        [in]        SYNCSCHEDULECOOKIE *pSyncSchedCookie,
        [in]        DWORD dwFlags,
        [out]       ISyncSchedule **ppSyncSchedule);
Opens a Scheduled Synchonization Object.

Returns one of the following values:

| | |
|---|---|
| S_OK | The operation was successful. |
| ERROR_NOT_FOUND* | The Schedule with the specified SYNCSCHEDULECOOKIE does not exist. |
| E_ACCESS_DENIED | Access denied to open this schedule. |
| E_INVALIDARG | One or more of the arguments are not valid. |
| E_OUTOFMEMORY | Not enough memory is available to complete the operation. | pSyncSchedCookie: Specifies the Sync schedule's SYNCSCHEDULECOOKIE.

ppSyncSchedule: Address of an interface pointer that receives the ISyncSchedule interface for the requested SYNCSCHEDULECOOKIE object.

dwFlags: Reserved for future use.

*Note: Errors will be returned in HRESULT_FROM_WIN32 format.

| ISyncScheduleMgr::RemoveSchedule |
|---|
| HRESULT RemoveSchedule (<br>    [in] SYNCSCHEDULECOOKIE *pSyncSchedCookie,<br>); |

Deletes a sync schedule object.
Returns one of the following values:

| | |
|---|---|
| S_OK | The operation was successful. |
| E_INVALIDARG | The arguments are not valid. |
| E_OUTOFMEMORY | Not enough memory is available. | pSyncSchedCookie: GUID that specifies the sync schedule's GUID.

| ISyncScheduleMgr::EnumSyncSchedules |
|---|
| HRESULT EnumSyncSchedules (<br>    [Out] IEnumSyncSchedules ** ppEmumSyncSchedules<br>); |

Retrieves a pointer to an OLE enumerator object that enumerates the sync schedules. Returns one of the following values:

| | |
|---|---|
| S_OK | The operation was successful. |
| E_INVALIDARG | The arguments are not valid. |
| E_OUTOFMEMORY | Not enough memory is available. | ppEnumSyncSchedules: Address of a pointer to an IEnumSyncSchedules interface. This interface contains the enumeration context of the current synchronization schedule(s).

IEnumSyncSchedules

Applications use the methods of the IEnumSyncSchedules interface to enumerate the synchronization schedule objects.

IEnumSyncSchedules::Next
HRESULT Next(
    [in] ULONG celt,
    [out] SYNCSCHEDULECOOKIE *pSyncSchedCookie,
    [out] ULONG * pceltFetched
);

Retrieves the next celt sync schedule objects in the enumeration sequence. If there are less than the requested number of elements left in the sequence, the remaining elements are retrieved.

Returns one of the following values:

| | |
|---|---|
| S_OK | The number of sync schedule objects retrieved equals the number requested |
| S_FALSE | The number returned is less than the number requested (thus there are no more sync schedule objects to enumerate). |
| E_INVALIDARG | A parameter is invalid. |
| E_OUTOFMEMORY | Not enough memory is available. |

Celt: Number of sync schedule objects to retrieve.

ppSyncSchedCookie: Address of an array of SYNCSCHEDULECOOKIEs that contain the GUIDs of sync schedule objects returned from the enumeration sequence. The client is responsible for freeing the array.

pceltFetched:Address of a value that contains the number of sync schedules returned in pSyncSchedCookie. If the celt parameter is 1, this parameter can be NULL.

IEnumSyncSchedules::Skip
HRESULT Skip(
    [in] ULONG celt);

Skips the next celt number of sync schedule objects in the enumeration sequence.

Returns one of the following values:

| | |
|---|---|
| S_OK | The number of elements skipped equals celt. |
| S_FALSE | The number of elements remaining in the sequence is less than celt. |
| E_INVALIDARG | celt is less than or equal to zero. |

Celt: Number of sync schedules to be skipped.

IEnumSyncSchedules::Reset

HRESULT Reset(void);

Resets the enumeration sequence to the beginning.

Returns S_OK if successful, or E_OUTOFMEMORY if there is not enough available memory.

A call to this method does not guarantee that the same set of sync schedule objects will be enumerated after the reset.

| IEnumSyncSchedules::Clone |
|---|
| HRESULT Clone ( <br>     [out] IEnumSyncSchedules ** ppEnumSyncSchedules <br> ); |

Creates another enumerator that contains the same enumeration state as the current one. Using this method, a client can record a particular point in the enumeration sequence and return to that point later. The new enumerator supports the same interface as the original.

Returns one of the following values:

| | |
|---|---|
| S_OK | The operation was successful. |
| E_INVALIDARG | The argument is not valid. |
| E_OUTOFMEMORY | There is not enough memory available. |
| E_UNEXPECTED | An error occurred. | ppEnumSyncSchedules: Address of a pointer to an IEnumSyncSchedules interface that will be assigned to the newly created enumeration. If the method fails, this parameter will be NULL.

ISyncSchedule

Applications use the methods of the ISyncSchedule interface to set and retrieve sync schedule information for a particular synchronization schedule object.

ISyncSchedule::GetFlags
HRESULT GetFlags(
    [out] DWORD *pdwFlags);

Retrieves the flags for the specified SyncSchedule.
Returns one of the following values:

| | |
|---|---|
| S_OK | The operation was successful. |
| E_INVALIDARG | The arguments are not valid. |
| E_OUTOFMEMORY | Not enough memory is available. | pdwFlags: Pointer to dword containing information about the sync schedule.

Currently, two flags are used by the SyncSchedule. Others are reserved for future use.

define SYNCSCHEDINFO_FLAGS_READONLY 0x0001 define SYNCSCHEDINFO_FLAGS_AUTOCONNECT 0x0002 define SYNCSCHEDINFO_FLAGS_AUTOHIDDEN 0x0004

If (dwFlags & SYNCSCHEDINFO_FLAGS_READONLY) the schedule times will be uneditable by the user. This is useful for publisher defined synchronization schedules.

If (dwFlags & SYNCSCHEDINFO_FLAGS_AUTOCONNECT) the Sync Manager will attempt to automatically establish the Connection prior to synchronizing.

If (dwFlags & SYNCSCHEDINFO_FLAGS_AUTOHIDDEN) the Sync Schedule will be hidden, and not enumerated in the list of sync schedules.

ISyncSchedule::SetFlags
HRESULT SetFlags(
    [in] DWORD dwFlags);

Sets the flags for a specified Synchronization Schedule object.

Returns one of the following values:

| | |
|---|---|
| S_OK | The operation was successful. |
| E_INVALIDARG | The arguments are not valid. |
| E_OUTOFMEMORY | Not enough memory is available. | dwFlags: dword containing information about the sync schedule. See above descriptions of the flags.

ISyncSchedule::GetConnection
HRESULT GetConnection(
    [in, out] DWORD *pcbSize,
    [out] LPWSTR pwszConnectionName,
    [out] DWORD *pdwConnType);

Gets the Connection for this Sync Schedule Object.
Returns one of the following values:

| | |
|---|---|
| S_OK | The operation was successful. |
| E_INSUFFICIENT | |
| E_INVALIDARG | The arguments are not valid. |
| E_OUTOFMEMORY | Not enough memory is available. | pwszConnectionName: A character string that will contain the retrieved Connection name.

pdwConnType: A pointer to DWORD that will contain the type of connection. This can be either SYNCSCHEDINFO_FLAGS_CONNECTION_LAN or SYNCSCHEDINFO_FLAGS_CONNECTION_WAN.

PcbSize Address of the DWORD containing the size of buffer allocated for ppwszScheduleName. If the buffer is too small, this param will be filled in with the needed size.

ISyncSchedule::SetConnection
HRESULT SetConnection(
    [in] LPCWSTR pwszConnectionName,
    [in] DWORD dwConnType);

Sets the Connection for this Sync Schedule Object.
Returns one of the following values:

| | |
|---|---|
| S_OK | The operation was successful. |
| E_INVALIDARG | The arguments are not valid. |
| E_OUTOFMEMORY | Not enough memory is available. | pwszConnectionName: Character string that contains the Connection name. The Connection name is limited to MAX_PATH characters.

pdwConnType: DWORD that contains the type of connection. This can be either SYNCSCHEDINFO_FLAGS_CONNECTION_LAN or SYNCSCHEDINFO_FLAGS_CONNECTION_WAN. If this parameter is SYNCSCHEDINFO_FLAGS_CONNECTION_WAN, pwszConnectionName must be non-null.

ISyncSchedule::GetScheduleName
HRESULT GetScheduleName(
    [in, out] DWORD *pcbSize,
    [out] LPWSTR pwszScheduleName);

Gets the friendly Schedule name for this Sync Schedule Object.
Returns one of the following values:

| | |
|---|---|
| S_OK | The operation was successful. |
| E_INVALIDARG | The arguments are not valid. |
| E_OUTOFMEMORY | Not enough memory is available. |

PpwszScheduleName: A character string that will contain the retrieved friendly schedule name.

PcbSize: Address of the DWORD containing the size of buffer allocated for ppwszScheduleName. If the buffer is too small, this param will be filled in with the needed size.

ISyncSchedule::SetScheduleName
HRESULT SetScheduleName(
    [in] LPCWSTR pwszNewScheduleName);

Set the friendly name of a Scheduled Synchronization Object.
Returns one of the following values:

| | |
|---|---|
| S_OK | The operation was successful. |
| SYNCMGR_E_NAME_IN_USE | A schedule with the specified name is already in use. |
| E_ACCESS_DENIED | Access to rename this schedule denied. |
| E_INVALIDARG | One or more of the arguments are not valid. |
| E_OUTOFMEMORY | Not enough memory is available to complete the operation. | pwszNewScheduleName: LPCWSTR that specifies the sync schedule's new friendly name. This friendly name must be unique. If the name is already being used by and existing schedule, this method will return SYNCMGR_E_NAME_IN_USE. The Friendly name must be at most MAX_PATH characters.

ISyncSchedule::GetScheduleCookie
HRESULT GetScheduleName (
    [out] SYNCSCHEDULECOOKIE *pSyncSchedCookie);

Gets the Schedule Cookie for this Sync Schedule Object.
Returns one of the following values:

| | |
|---|---|
| S_OK | The operation was successful. |
| E_INVALIDARG | The arguments are not valid. |
| E_OUTOFMEMORY | Not enough memory is available. |

PSyncSchedCookie: A pointer to SYNCSCHEDULECOOKIE that will contain the GUID of the schedule.

ISyncSchedule::SetAccountInformation
HRESULT SetAccountInformation(
    [in] LPCWSTR pwszAccountName,
    [in] LPCWSTR pwszPassword);

Sets the account name and password for the sync schedule. This method is for Windows NT®; it does nothing in Windows® 95.
Returns one of the following values:

| | |
|---|---|
| S_OK | The operation was successful. |
| E_INVALIDARG | The arguments are not valid. |
| E_OUTOFMEMORY | Not enough memory is available. |

PwszAccountName: LPCWSTR that contains the account name. This account name is assigned to the current task.

PwszPassword: LPCWSTR that contains the account password. This password is assigned to the current task.

ISyncSchedule::GetAccountInformation
HRESULT GetAccountInformation(
    [in, out] DWORD *pcbSize,
    [out] LPWSTR pwszAccountName);

Retrieves the account name for the sync schedule. This method is for Windows NT®; it does nothing in Windows® 95.

Returns one of the following values:

| | |
|---|---|
| S_OK | The operation was successful. |
| E_INVALIDARG | The arguments are not valid. |
| SCHED_E_ACCOUNT_INFORMATION_NOT_SET | The Account info has not been set. |
| SCHED_E_CANNOTOPENTASK | GetAccountInfo can only retrieve Account info from Schedules that have been previously persisted with Account info. saved. |
| E_OUTOFMEMORY | Not enough memory is available. |

PpwszAccountName: An LPWSTR that will contain the account name for the current task.

PcbSize : Address of the DWORD containing the size of buffer allocated for ppwszAccountName. If the buffer is too small, this param will be filled in with the needed size.

The method that invokes GetAccountInformation is responsible for freeing the string.

ISyncSchedule::GetTrigger
HRESULT GetTrigger(
    [out] ITaskTrigger ** ppTrigger);

Gets the task trigger for this Sync Schedule Object.
Returns one of the following values:

| | |
|---|---|
| S_OK | The operation was successful. |
| E_INVALIDARG | The arguments are not valid. |
| E_OUTOFMEMORY | Not enough memory is available. | ppTrigger Address of a pointer to an ITaskTrigger interface.

ISyncSchedule::GetNextRunTime
HRESULT GetNextRunTime(
    [out] SYSTEMTIME * pstNextRun);

Retrieves the next time the sync schedule item will run.
Returns one of the following values:

| | |
|---|---|
| S_OK | The operation was successful. |
| E_INVALIDARG | The arguments are not valid. |
| E_OUTOFMEMORY | Not enough memory is available. |

PstNextRun: Address of a SYSTEMTIME structure that contains the next time the work item will run.

ISyncSchedule::GetMostRecentRunTime
HRESULT GetMostRecentRunTime(
    [out] SYSTEMTIME * pstRecentRun
);

Retrieves the most recent time the sync schedule began running.

Returns one of the following values:

| | |
|---|---|
| S_OK | The operation was successful. |
| E_INVALIDARG | The arguments are not valid. |
| E_OUTOFMEMORY | Not enough memory is available. |
| SCHED_S_TASK_HAS_NOT_RUN | The sync schedule has never run. |

PstLastRun: Address of a SYSTEMTIME structure that contains the most recent time the current task ran.

ISyncSchedule::EditSyncSchedule
HRESULT EditSyncSchedule(
    [in] HWND hParent,
    [in] DWORD dwReserved);

Opens the configuration properties for the sync schedule item.
Returns one of the following values:

| | |
|---|---|
| S_OK | The operation was successful. |
| S_FALSE | The user hit CANCEL |
| STG_E_NOTFILEBASEDSTORAGE | The task object is not persistent. |
| E_INVALIDARG | The arguments are not valid. |
| E_OUTOFMEMORY | Not enough memory is available. |

HParent: Handle to the parent window of the configuration properties window.

DwReserved: Reserved for future use; this parameter is ignored.

```
typedef struct_tagSYNC_HANDLER_ITEM_INFO
}   GUID            handlerID;
    SYNCMGRITEMID   itemID;
    HICON           hIcon;
    WCHAR           wszItemName [MAX_SYNCMGRITEMNAME];
    DWORD           dwCheckState;
}   SYNC_HANDLER_ITEM_INFO,
*LPSYNC_HANDLER_ITEM_INFO;
```

ISyncSchedule::AddItem

| ISyncSchedule::AddItem |
|---|
| HRESULT AddItem(<br>    [in] LPSYNC_HANDLER_ITEM_INFO pHandlerItemInfo); |

Add the specified handler item to this Sync Schedule object.
Returns one of the following values:

| | |
|---|---|
| S_OK | The operation was successful. |
| E_INVALIDARG | The arguments are not valid. |
| E_OUTOFMEMORY | Not enough memory is available. | pHandlerItemInfo: Pointer to the application handler/item data for which to add the item. The item will be added and registered with the handler items.

```
ISyncSchedule::SetItemCheck
HRESULT SetItemCheck(
        [in] REFCLSID pHandlerID,
        [in] SYNCMGRITEMID *pItemID,
        [in] DWORD dwCheckState);
```

Sets the check state of the specified handler item.
Returns one of the following values:

| S_OK | The operation was successful. |
|---|---|
| E_INVALIDARG | The arguments are not valid. |
| E_OUTOFMEMORY | Not enough memory is available. | pHandlerID: Specifies a pointer to the application handler ID for which to add the item pItemID: A pointer to a SYNCMGRITEMID that uniquely identifies a scheduled sync item for the specified handler.

dwCheckState: The Check State. 1==Checked, 0==Unchecked.

```
ISyncSchedule::GetItemCheck
HRESULT GetItemCheck(
        [in] REFCLSID pHandlerID,
        [in] SYNCMGRITEMID *pItemID,
        [out] DWORD *pdwCheckState);
```

Sets the check state of the specified handler item.
Returns one of the following values:

| S_OK | The operation was successful. |
|---|---|
| E_INVALDARG | The arguments are not valid. |
| E_OUTOFMEMORY | Not enough memory is available. | pHandlerID: Specifies a pointer to the application handler ID for which to add the item pItemID: A pointer to a SYNCMGRITEMID that uniquely identifies a scheduled sync item for the specified handler.

pdwCheckState: A pointer to DWORD to receive the Check State. 1==Checked, 0==Unchecked.

```
ISyncSchedule::EnumItems
HRESULT EnumItems(
        [in] REFCLSID pHandlerID,
        [in] IEnumSyncItems **ppEnumItems);
```

Retrieves a pointer to an OLE enumerator object that enumerates the items on the current sync schedule.
Returns one of the following values:

| S_OK | The operation was successful. |
|---|---|
| E_INVALIDARG | The arguments are not valid. |
| E_OUTOFMEMORY | Not enough memory is available. | pHandlerID: Specifies a pointer to the application handler ID for which to enumerate. If this parameter is GUID_NULL, the IEnumSyncItems interface will enumerate all synchronization items for all handlers.

ppEnumItems: Address of a pointer to an IEnumSyncItems interface. This interface contains the enumeration context for the item(s) on the current sync schedule object.

ISyncSchedule::Save
HRESULT Save( );

Commits the sync schedule to disk. Clients call this method to persist any changes made to the SyncSchedule.
Returns one of the following values:

| S_OK | The operation was successful. |
|---|---|
| E_FAIL | The sync schedule save not saved |

IEnumSyncItems

Applications use the methods of the IEnumSyncItems interface to enumerate the sync items on a given synchronization schedule.

```
typedef struct_tagSYNC_HANDLER_ITEM_INFO
{       GUID            handlerID;
        SYNCMGRITEMID   itemID;
        HICON           hIcon;
        WCHAR           wszItemName[MAX_SYNCMGRITEMNAME];
        DWORD           dwCheckState;
} SYNC_HANDLER_ITEM_INFO,
*LPSYNC_HANDLER_ITEM_INFO;
```

IEnumSyncItems::Next

```
IEnumSyncItems::Next
HRESULT Next(
        ULONG celt,
        [out] SYNC_HANDLER_ITEM_INFO **ppHandlerItemList
        [out] ULONG * pceltFetched
);
```

Retrieves the next celt sync items in the enumeration sequence. If there are fewer than the requested number of elements left in the sequence, the remaining elements are retrieved.
Returns one of the following values:

| S_OK | The number of sync schedules retrieved equals the number requested. |
|---|---|
| S_FALSE | The number returned is less than the number requested (thus there are no more sync schedules to enumerate). |
| E_INVALIDARG | A parameter is invalid. |
| E_OUTOFMEMORY | Not enough memory is available. |

Celt: Number of sync items to retrieve.

ppHandlerItemList: Address of an array of pointers to SYNC_HANDLER_ITEM_INFO Struct, returned from the enumeration sequence. Clients are responsible for freeing each of the SYNC_HANDLER_ITEM_INFO pointers in the array, and the array itself.

pceltFetched:Address of a value that contains the number of SYNC_HANDLER_ITEM_INFO struct pointers returned in ppHandlerItemList. If the celt parameter is 1, this parameter can be NULL.

```
IEnumSyncItems::Skip
HRESULT Skip(
    [in] ULONG celt,
);
```

Skips the next celt number of sync items in the enumeration sequence.
Returns one of the following values:

| | |
|---|---|
| S_OK | The number of elements skipped equals celt. |
| S_FALSE | The number of elements remaining in the sequence is less than celt. |
| E_INVALIDARG | Celt is less than or equal to zero. |

Celt: Number of sync schedules to be skipped.
IEnumSyncItems::Reset
HRESULT Reset(void);
Resets the enumeration sequence to the beginning.
Returns S_OK if successful, or E_OUTOFMEMORY if there is not enough available memory.
A call to this method does not guarantee that the same set of sync items will be enumerated after the reset.

```
IEnumSyncItems::Clone
HRESULT Clone(
    IEnumSyncItems ** ppEnumSyncItems
);
```

Creates another enumerator that contains the same enumeration state as the current one. Using this method, a client can record a particular point in the enumeration sequence and return to that point later. The new enumerator supports the same interface as the original.
Returns one of the following values:

| | |
|---|---|
| S_OK | The operation was successful. |
| E_INVALIDARG | The argument is not valid. |
| E_OUTOFMEMORY | There is not enough memory available. |
| E_UNEXPECTED | An error occurred. |

PpEnumSyncItems: Address of a pointer to an IEnumSyncItems interface that will be assigned to the newly created enumeration. If the method fails, this parameter is NULL.

As can be seen from the foregoing detailed description, there is provided a centralized synchronization manager that provides a user with a consistent user experience while eliminating the need for the user to separately launch applications to synchronize data. Synchronization takes place on events triggered according to a user's preferences, and may be automatic according to the user preferences and/or a schedule, or manual. The synchronization manager provides standard interfaces usable by any application to handle the synchronization of data in a consistent, efficient and extensible way.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A system for managing the synchronization of data, comprising, a centralized management component, a plurality of synchronization handlers registered with the centralized management component, each synchronization handler corresponding to a separate program having data maintained at different locations, the management component receiving a synchronization event, and in response thereto loading at least one of the synchronization handlers, each loaded synchronization handler called by the centralized management component to synchronize the data of its corresponding program.

2. The system of claim 1 wherein each synchronization handler includes software object interfaces to methods therein, and the centralized management component calls at least one methods of each loaded synchronization handler via the software object interfaces.

3. The system of claim 1 wherein the centralized management component includes at least one dialog for interfacing with the user.

4. The system of claim 3 wherein at least one dialog comprises a settings dialog for obtaining user preference information.

5. The system of claim 3 wherein at least one dialog comprises a progress dialog for displaying synchronization information to the user.

6. The system of claim 5 wherein the progress dialog obtains information from the synchronization handler for displaying to the user.

7. The system of claim 3 wherein the synchronization event is manually generated by the user, and wherein at least one dialog comprises a choice dialog for obtaining user input.

8. The system of claim 6 wherein the choice enables the user selection of items related to an application.

9. The system of claim 1 wherein the centralized management component creates an event object in response to the event.

10. The system of claim 1 wherein the centralized management component creates a job information object to maintain information about the event.

11. The system of claim 1 wherein the centralized management queues a plurality of synchronization handlers.

12. The system of claim 1 wherein the event is automatically generated by a system component.

13. The system of claim 1 wherein the event is automatically generated at a logon.

14. The system of claim 1 wherein the event is automatically generated at a logoff.

15. The system of claim 1 wherein the event is automatically generated at a machine idle time.

16. The system of claim 1 further comprising a scheduling service for generating the event.

17. The system of claim 1 wherein the data maintained at different locations for a program having a corresponding synchronization handler loaded therefor is maintained on a local machine and a network machine, and further comprising a connection object for administering a connection to the network machine.

18. The system of claim 1 further comprising a notification mechanism for providing the synchronization event, and an interprocess communication mechanism for communicating between the management component and the notification mechanism.

19. The system of claim 1 further comprising an interprocess communication mechanism for communicating between the management component and the synchronization handler.

20. The system of claim 19 wherein the interprocess communication mechanism includes COM.

21. The system of claim 19 wherein the interprocess communication mechanism includes local procedure call.

22. The system of claim 19 wherein the interprocess communication mechanism includes lightweight remote procedure call.

23. The system of claim 19 wherein the interprocess communication mechanism includes Sockets.

24. The system of claim 19 wherein the interprocess communication mechanism includes Windows messages.

25. The system of claim 19 wherein the interprocess communication mechanism includes Shared Memory.

26. The system of claim 1 wherein each synchronization handler is loaded and called by the centralized management component independent of whether the program to which the synchronization handler corresponds is running.

27. A computer-readable medium having computer-executable instructions for performing steps comprising:
   receiving a synchronization event at a central synchronization service;
   obtaining user preference information related to the synchronization event;
   loading at least one synchronization handler, each synchronization handler corresponding to a separate application or component that has data capable of being synchronized; and
   directing from the central service each loaded synchronization handler to synchronize data based on the user preference information in response to the synchronization event.

28. The computer-readable medium of claim 27 having further computer-executable instructions for performing the step of providing a dialog for obtaining user input.

29. The computer-readable medium of claim 27 having further computer-executable instructions for performing the step of providing a dialog for displaying information to a user.

30. The computer-readable medium of claim 27 having further computer-executable instructions for performing the step of triggering the event.

31. The computer-readable medium of claim 27 wherein the step of obtaining user preference information includes the step of providing a dialog to a user.

32. The computer-readable medium of claim 27 wherein the step of obtaining user preference information includes the step of accessing stored information.

33. The computer-readable medium of claim 27 having further computer-executable instructions for performing the step of determining that a network is connected.

34. The computer-readable medium of claim 27 wherein the step of loading at least one synchronization handler includes the step of loading a plurality of handlers registered with the synchronization service.

35. The computer-readable medium of claim 27 wherein the step of directing each loaded synchronization handler includes the step of calling at least one interface of the synchronization handler.

36. The computer-readable medium of claim 35 wherein the step of calling at least one interface of the synchronization handler includes the steps of calling an interface to prepare for synchronization and calling an interface to perform the synchronization.

37. The computer-readable medium of claim 27 having further computer-executable instructions for performing the steps of receiving information from the synchronization handler via at least one callback therefrom, and displaying information corresponding to a callback.

38. The computer-readable medium of claim 27 wherein each synchronization handler is loaded and called by the centralized management component independent of whether the application or component to which the synchronization handler corresponds is running.

39. In a computer system having a local computer connected to a remote network of computers, a method of synchronizing data between the local computer and the network, comprising, registering with a central manager of the local computer a plurality of application handlers, each application handler corresponding to a separate application or component having data stored on the network, receiving a synchronization event at the central manager, loading at least one of the application handlers in response to the event, and calling each loaded handler to synchronize data between the local machine and the network for the application or component to which the handler corresponds.

40. The method of claim 39 further comprising displaying progress information related to the synchronization.

41. The method of claim 39 further comprising receiving progress information related to the synchronization from each called handler.

42. The method of claim 39 wherein receiving a synchronization event at the central manager includes receiving a manual synchronization request from a user.

43. The method of claim 42 further comprising providing a user interface to receive user input.

44. The method of claim 39 wherein receiving a synchronization event at the central manager includes receiving an automatically triggered event.

45. The method of claim 39 wherein the automatically triggered event is scheduled.

46. The method of claim 39 wherein loading at least one of the handlers includes queuing each of the handlers.

47. The method of claim 46 further comprising maintaining event information in association with each queued handler.

48. The method of claim 39 further comprising maintaining network connection information in a connection object.

49. The method of claim 39 wherein each synchronization handler is loaded and called by the centralized management component independent of whether the application or component to which the synchronization handler corresponds is running.

50. A computer-readable medium having computer-executable instructions for performing the method of claim 39.

* * * * *